US006848523B2

United States Patent
Ishikawa et al.

(10) Patent No.: US 6,848,523 B2
(45) Date of Patent: Feb. 1, 2005

(54) WALK-BEHIND WORKING MACHINE

(75) Inventors: Tomoaki Ishikawa, Wako (JP); Kazuyoshi Miyahara, Wako (JP); Susumu Ohkubo, Wako (JP); Hiromitsu Sasaki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/124,350

(22) Filed: Apr. 16, 2002

(65) Prior Publication Data

US 2003/0006074 A1 Jan. 9, 2003

(30) Foreign Application Priority Data

May 23, 2001 (JP) ........................................ 2001-154530
May 24, 2001 (JP) ........................................ 2001-155289

(51) Int. Cl.[7] ............................................. B62D 51/04
(52) U.S. Cl. .................... 180/19.3; 192/66.2; 192/13.34
(58) Field of Search ................................ 56/11.7, 11.8; 192/66.2, 113.34; 180/19.1, 19.3

(56) References Cited

U.S. PATENT DOCUMENTS

| | | | | |
|---|---|---|---|---|
| 3,815,443 A | * | 6/1974 | McAninch et al. | 475/235 |
| 4,552,259 A | * | 11/1985 | Albertson | 192/107 M |
| 4,689,939 A | * | 9/1987 | Seyerle | 56/11.1 |
| 4,762,205 A | * | 8/1988 | Ortman | 188/71.2 |
| 4,841,794 A | * | 6/1989 | Hikishima | 74/371 |
| 4,907,401 A | * | 3/1990 | Nemoto et al. | 56/11.3 |
| 5,033,599 A | * | 7/1991 | Hays | 192/70.27 |
| 5,435,797 A | * | 7/1995 | Harris | 477/180 |
| 5,718,105 A | * | 2/1998 | Irikura et al. | 56/11.4 |
| 5,778,645 A | * | 7/1998 | Irikura et al. | 56/11.8 |
| 5,850,758 A | * | 12/1998 | McCloud et al. | 74/371 |
| 5,887,484 A | * | 3/1999 | Abend et al. | 74/424 |
| 6,596,789 B2 | * | 7/2003 | Nakamura et al. | 523/155 |
| 2002/0034994 A1 | * | 3/2002 | Johnson et al. | 474/11 |
| 2002/0189137 A1 | * | 12/2002 | Cox et al. | 37/242 |
| 2003/0045398 A1 | * | 3/2003 | Blanchard | 477/107 |
| 2003/0066704 A1 | * | 4/2003 | Blanchard | 180/383 |

FOREIGN PATENT DOCUMENTS

| | | | | |
|---|---|---|---|---|
| DE | 10035489 A1 | * | 1/2002 | F16D/23/04 |
| GB | 1341907 | * | 12/1973 | F16D/67/06 |
| JP | 03157520 | | 7/1991 | |

* cited by examiner

*Primary Examiner*—Daniel G. DePumpo
(74) *Attorney, Agent, or Firm*—Adams & Wilks

(57) ABSTRACT

A walk-behind working machine has a drive source, wheels rotationally driven by the drive source, and a traveling clutch for transmitting driving power from the drive source to the wheels. A driving member is disposed in the case and has a first friction surface. A driven member is mounted in the case for undergoing rotation relative to the driving member and has a second friction surface positioned to be brought into surface contact with the first friction surface at a preselected surface pressure. A characteristic curve of the traveling clutch plotted in a coordinate system including a vertical axis representing a coefficient of friction between the first and second friction surfaces and a horizontal axis representing a parameter obtained by dividing by the preselected surface pressure a product of a viscosity of the lubricating oil and a number of times the driven member rotates relative to the driving member per second has a first straight line and a second straight line connected to the first straight line via a bent point. The preselected surface pressure is determined so that the bent point corresponds to a switch point when the working machine is switched from a first state in which the walk-behind working machine operates at a high load to a second state in which the walk-behind working machine operates at a low load.

34 Claims, 23 Drawing Sheets

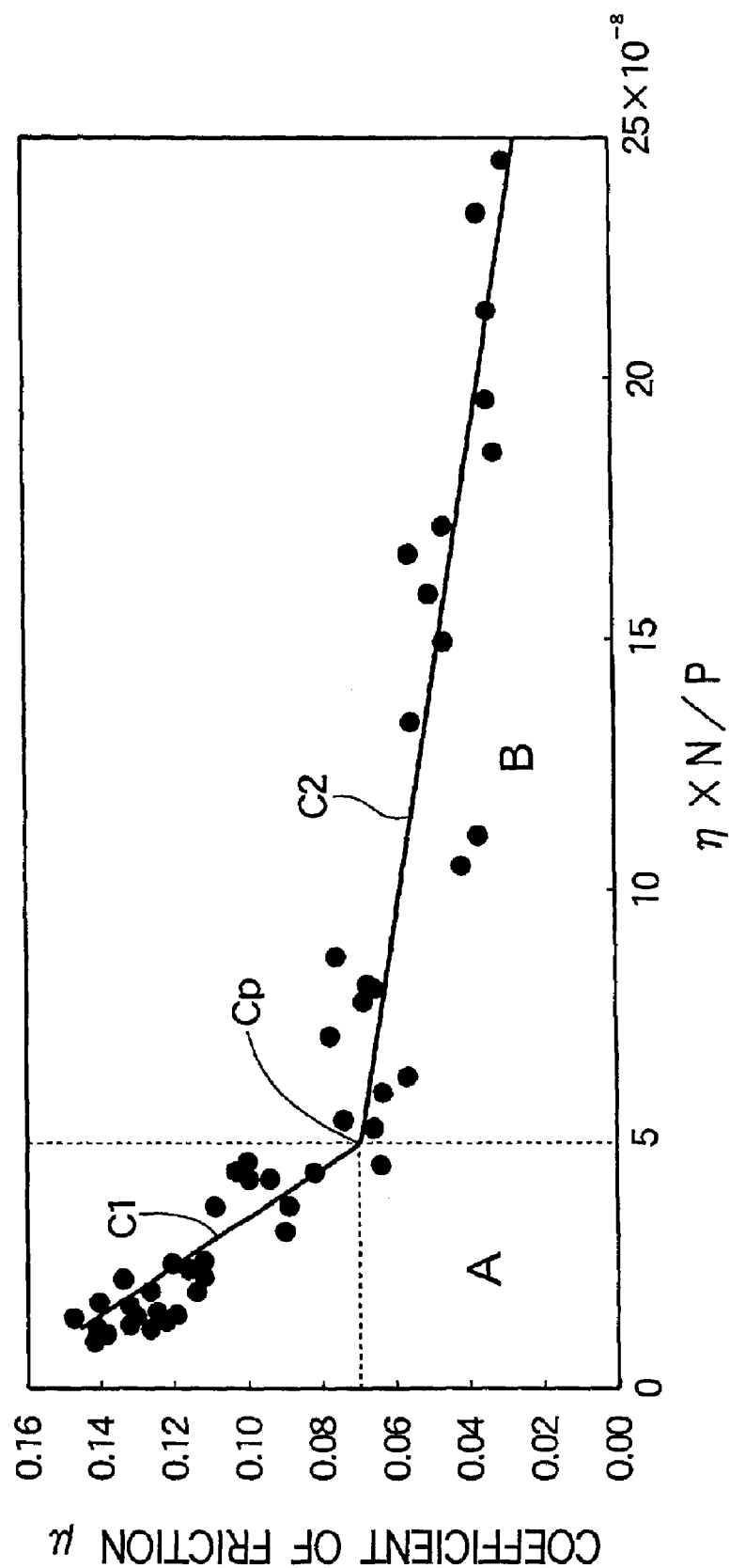

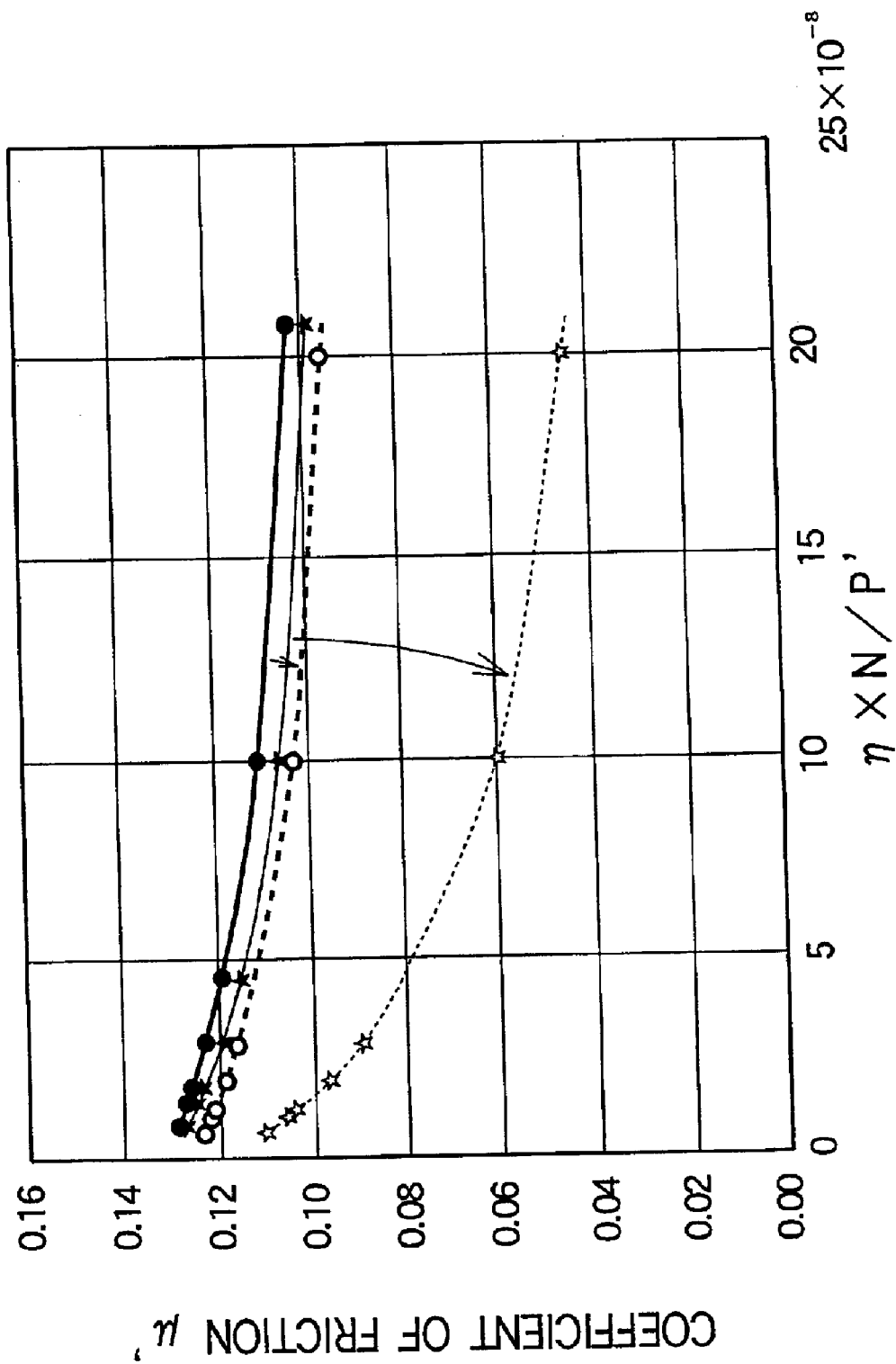

WALK-BEHIND WORKING MACHINE

FIELD OF THE INVENTION

The present invention relates to an improvement in a walk-behind working machine including running wheels and a drive source for driving the drive wheels.

BACKGROUND OF THE INVENTION

Known walk-behind working machines include walk-behind lawn mowers. FIG. 23 hereof illustrates, in side elevation, an example of such walk-behind lawn mowers. A walk-behind lawn mower 200 for mowing grass 201 includes an engine 202, a clutch 208 for transmitting a drive power from the engine 202 to rear wheels 209, and a blade 203 to be rotated by the power from the engine 202. The lawn mower 200 also includes a handle 205, a grip 206 attached to the handle 205, and a clutch lever 207 mounted to the handle 205. Front wheels of the lawn mower 200 are designated 210. In mowing the grass 201 using the lawn mower 200, an operator 204 first actuates the engine 202 to thereby rotate the blade 203. The operator 204 then turns the clutch lever 207 forwardly, holding the grip 206 to thereby switch the clutch 208 to an on state in which the drive power of the engine 202 is transmitted via the clutch 208 to the rear wheels 209. This allows the lawn mower 200 to self-propel or travel on flat or sloped ground while mowing the grass 201.

For some applications, the clutch 208 is often a cheap, simply arranged dog clutch which can be rapidly brought into engagement. If the lawn mower 200 employs the dog clutch, the former would suddenly start to move quickly. At this time, the rear wheels 208 can cause its wheelspin. In addition, the front wheels 210 can also be suddenly lifted up together with the blade 203. The wheelspin of the rear wheels 208 would adversely lay or otherwise irregularly cut the grass 201. The dog clutch is not preferred because the lawn mower 200, when starting to move, is difficult to manipulate in such a manner as to satisfactorily mow the grass 201. The operator 204 needs to have high skill in manipulating such a lawn mower.

To solve the above problem, one may propose to provide the lawn mower 200 arranged to travel at a variety of selected velocities. With this arrangement, the lawn mower 200 can begin to move at a low velocity.

More specifically, the thus arranged lawn mower 200 further includes a continuously variable transmission interposed between the engine 202 and the rear wheels 209, and a speed change lever for operating the variable transmission. The operator 204 can change a speed of the lawn mower 200 by handling the speed change lever.

Addition of the variable transmission makes the lawn mower expensive. Moreover, the operator 204 needs to tiresomely handle the speed change lever as well as the clutch lever 207.

Alternatively, the working machine can employ a belt slip clutch including a driving pulley, a driven pulley, and a belt running over the pulleys. Tension in the belt can be varied. This arrangement eliminates the need to provide the costly variable transmission to the lawn mower. This belt slip clutch is designed to be brought to a slipped state in which the belt slips on the pulleys, so that the lawn mower begins to move at a low speed.

The tension in the belt can be varied in correspondence to a force exerted on the clutch lever 207 by the operator 204. The operator 204 can thus bring the clutch into and out of engagement as well as changing the velocity of the lawn mower. When the operator turns forwardly the clutch lever 207, pushing the grip 206, the belt slip clutch is operated such that the lawn mower 200 travels at low or high loads. When "the working machine travels at the low load", it is meant that the working machine runs on flat ground, for example. When "the lawn mower 200 travels at the high load", it is meant that the lawn mower 200 runs on sloped ground, for example.

The operator 204 must push the clutch lever 207 with a large force so as to cause the clutch 208 to transmit a maximum power from the engine 202 to the rear wheels 209. It is thus preferred that the lawn mower 200 include a link mechanism etc. for increasing a small force exerted by the operator 204 on the clutch lever 207 so as to achieve the transmission of the maximum power from the engine 202 to the rear wheels 209.

The smaller the force required to achieve the transmission of the maximum power is, however, the smaller a minimum force required to engage the clutch 208 is. It is thus likely that exertion of even a very small force on the lever 207 would bring the clutch into engagement. In other words, the lawn mower 200 would begin to move even when the operator 204 unintentionally lightly touches the clutch lever 207. For this reason, the minimum force is preferably larger in magnitude than a given value.

In order to change the speed of the lawn mower 200, one may further propose to provide the lawn mower 200 with a slip clutch as disclosed, for example, in Japanese Patent Laid-Open Publication No. HEI 3-157520 entitled "SLIP CLUTCH HAVING A SPHERICAL FRICTION SURFACE".

The disclosed slip clutch includes a slip plate having a concave surface, a friction plate applied to the concave surface of the slip plate, and a pressure plate having a convex surface to be in friction engagement with the friction plate. Where the lawn mower 200 employs the slip clutch, when the slip clutch is engaged, the pressure plate comes into engagement with the friction plate to thereby produce a friction force therebetween, such that a drive power from the engine is transmitted to the rear wheels.

The operator 204 engages or disengages the slip clutch as well as changing the velocity of the lawnmower 200 by pushing the clutch lever 207 with forces of different magnitudes. The operator 204 turns the clutch lever 207 forwardly, pushing the grip 206 to thereby engage the slip clutch, such that the lawn mower 200 travels at the low or high load.

The slip clutch is used for a long time in a slipped state in which the friction plate slips on the pressure plate. The magnitude of the friction force produced between the friction plate and the pressure plate when the clutch began to be used must be maintained for a long period of time.

At a time when the slip clutch begins to be used, the concave surface of the friction plate and the convex surface of the pressure plate provide increased surface roughness. The concave surface and the convex surface therefore have their relatively small areas contacting each other. For the slip clutch which has been used for a long period of time, whereas, the friction plate and the pressure plate are worn. As a result, the worn friction plate and pressure plate undesirably contact each other along the increased surfaces thereof. More specifically, the contact areas of the concave surface of the friction plate and the convex surface of the pressure plate become large. A surface pressure between the friction plate and the pressure plate is smaller when the clutch is used for the long time than when the clutch began to be used even if the magnitude of a force that presses the pressure plate against the friction plate is constant. Consequently, a friction force produced between the pressure plate and the friction plate is small. The slip clutch thus arranged would be less properly operated.

To address this problem, the friction plate and the pressure plate can be produced with increased precision to provide decreased surface roughness, such that the contact area becomes large when the slip clutch begins to be used. However, producing the friction plate and the pressure plate with increased precision requires a high cost.

With the foregoing in view, what has been needed is an inexpressive clutch which can be advantageously used in the slipped state for a long period of time.

SUMMARY OF THE INVENTION

An object of the present invention is to provide a walk-behind working machine including a clutch for transmitting driving power from an engine to running wheels of the machine, and a pivotable grip clutch lever for engaging and disengaging the clutch. Even when a pushing force exerted on the lever is slightly increased, the clutch transmits a greatly increased drive power to the running wheels while the working machine travels at a high load. The clutch transmits a substantially constant drive power to the driving wheels regardless of change in the force exerted on the lever while the working machine travels at a low load.

Another object of the present invention is to provide a walk-behind working machine including a less costly clutch which can be reliably used in the slipped state for a long period of time.

According to one aspect of the present invention, there is provided a walk-behind working machine providing a first state and a second state, the working machine in the first state running at a high load, the working machine in the second state running at a low load, the working machine comprising: (A) a drive source; (B) running wheels; and (C) a traveling clutch interposed between the drive source and the running wheels; the traveling clutch including: (a) a case containing a lubricating oil; (b) a driving member having a friction surface; and (c) a driven member having a friction surface; the driving and driven members being disposed within the case in such a manner as to be submerged in the lubricating oil; the friction surfaces of the driving and driven members being arranged to contact each other to produce a surface pressure therebetween; the surface pressure determining whether the traveling clutch is brought from an off state in which the friction surfaces of the driving and driven members do not contact each other to a slipped state in which the driven member slips on the driving member; the traveling clutch providing a characteristic curve shown in a coordinate system including a vertical axis representing a coefficient of friction between the friction surfaces of the driving and driven members and a horizontal axis representing a parameter obtained by dividing by the surface pressure a product of a viscosity of the lubricating oil and the number of times the driven member rotates relative to the driving member per second, the characteristic curve including a first straight line and a second straight line connected to the first straight line via a bent point, the surface pressure being determined such that the bent point corresponds to a switch point when the working machine is switched from the first state to the second state or vice versa.

The surface pressure determines whether the traveling clutch is switched from the off state to the slipped state. Since the traveling clutch includes the lubricating oil, a film of the oil is interposed between the friction surfaces of the driving and driven members.

In illustrated embodiments of the present invention as will be described hereinafter, the surface pressure is varied in correspondence to a pushing force that pushes a grip clutch lever of the working machine. Change in the surface pressure varies thickness of the film. When the surface pressure is small, the thickness is large. The thickened film provides the decreased coefficient of friction between the friction surfaces of the driving and driven members. Whereas, the thickness of the film is small when the surface pressure is large. As the film becomes thin, the coefficient of friction greatly increases.

The characteristic curve includes the first straight line and the second straight line. The first and second straight lines are connected to each other via the bent point. The first straight line lies in a first region providing the small parameter having the large surface pressure while the second straight line lies in a second region providing the large parameter having the small surface pressure. The first straight line is steeper than the second straight line.

The surface pressure is determined such that the bent point corresponds to a switch point when the working machine is switched from the first state to the second state or vice versa.

When in the first state, the working machine provides the parameter at any point on the first straight line of the characteristic curve in the coordinate system. The coefficient of friction greatly varies in correspondence to change in the pushing force.

Transmitting a maximum drive power from the drive source to the running wheels requires applying a limited pushing force to the grip clutch lever. Moreover, the transmission of the drive power requires the small change in the pushing force.

When in the second state, the working machine provides the parameter at any point on the second straight line of the characteristic curve in the coordinate system. Thus, the coefficient of friction is substantially constant regardless of change in the pushing force exerted on the grip clutch lever.

When the working machine travels at the low load, the surface pressure is small. The coefficient of friction remains substantially unchanged irrespective of the pushing force applied to the grip clutch lever. Namely, ability of the clutch to transmit the drive power from the drive source to the running wheels is not affected by slight change in the pushing force. The working machine thus arranged can begin to travel smoothly.

Although the pushing force varies in magnitude less greatly, the clutch transmits a wide range of the drive power from the drive source to the rear wheels.

The use of the traveling clutch is advantageous because transmission of maximum drive power from the drive source to the running wheels requires the limited pushing force. In other words, operation of the grip clutch lever can be achieved changing the pushing force less abruptly. This allows an operator to bear a reduced burden of manipulating the grip clutch lever. Moreover, the working machine does not begin to travel when the operator unintentionally touches the grip clutch lever. In other words, the working machine is arranged such that it begins to travel only when the operator intentionally manipulates the grip clutch lever.

In a preferred form of the present invention, the parameter is $5 \times 10^{-8}$ at the bent point.

When the working machine runs at the high load, according to the illustrated embodiment, the parameter is smaller than $5 \times 10^{-8}$. This results in the increased coefficient of friction between the friction surfaces of the driving and driven members. Accordingly, by increasing the pushing force little, there can be achieved significant improvement in ability of the clutch to transmit the drive power of the drive source to the running wheels.

When the working machine runs at the low load, the parameter is larger than $5 \times 10^{-8}$. This leads to the decreased coefficient of friction between the friction surfaces of the driving and driven members. It is thus unlikely that the ability of the clutch to transmit the drive power from the drive source to the rear wheels is affected by any change in the pushing force.

This arrangement allows the working machine to travel smoothly at both the high and low loads.

In a further preferred form of the present invention, at least one of the friction surface of the driving member and the friction surface of the driven member has a helical groove and plural straight grooves formed thereon. The straight grooves extend perpendicularly to the helical groove.

When the traveling clutch is used for a long time, the surfaces of the driving and driven members can be worn into contact with each other at the increased areas thereof. That is, the use of the clutch for the long time can increase the contact areas of the driving and driven members. The increased contact areas provides the reduced surface pressure even if the friction surface of the driven member at a time when the clutch has been used for the long period of time undergoes the same pressing force as that at a time when the clutch began to be used. When the surface pressure is reduced, the thickness of the film of the lubricating oil can be rendered large to thereby reduce the coefficient of friction between the friction surfaces of the driving and driven members. The coefficient of friction can be abruptly changed when the driving and driven members are brought from a boundary lubrication state to a mixed or hydrodynamic lubrication states.

As discussed hereinafter in detail, by the phrase "boundary lubrication state", it is meant that the film of the lubricating oil is sufficiently thin. The phrase "hydrodynamic lubrication state" means that the film of the lubricating oil is sufficiently thick. The mixed lubrication state is a mixture of the boundary lubrication state and the hydrodynamic lubrication state. In the hydrodynamic lubrication state, the friction surface of the driven member is completely kept off from the surface of the driving member to ensure that the film of the lubricating oil is interposed therebetween.

According to the present invention, the film of the lubricating oil remains thin. Therefore, the friction surfaces of the driving and driven members maintain the boundary lubrication regardless of the surface pressure. More specifically, at least one of the friction surface of the driving member and the friction surface of the driven member has the helical groove and the plural straight grooves extending perpendicularly to the helical groove. These grooves serve to discharge the lubricating oil and powder produced between the worn friction surfaces of the driving and driven members. The discharge of the oil and the powder makes it possible to keep the film thin.

The traveling clutch of the present invention provides the boundary lubrication state alone, and hence the coefficient of friction remains large. Consequently, the friction force produced between the friction surfaces of the driving and driven members when the clutch began to be used can be maintained for a long period of time. The clutch thus arranged can be operated stably for the long period of time. Furthermore, forming the helical groove and the plural straight grooves in at least one of the friction surfaces of the driving and driven members requires a low cost.

BRIEF DESCRIPTION OF THE DRAWINGS

Certain preferred embodiments of the present invention will hereinafter be described in detail, by way of example only, with reference to the accompanying drawings, in which:

FIG. 8 is a graphical representation of the coefficients of friction at various surface pressures;

FIG. 17B is operated, and FIG. 18B graphically shows the dependency of a coefficient of friction between female and male members of the traveling clutch of FIG. 17A and FIG. 17B on a surface pressure between the female and male members;

FIG. 20 is a graphic representation of coefficients of friction between the female and male portions at various surface pressures between the female and male portions when the traveling clutch of FIG. 17A and FIG. 17B and a different type of a traveling clutch began to be used (solid circles, solid stars and solid lines) and when those traveling clutches are used for a long time (open circles, open stars, and broken lines);

DETAILED DESCRIPTION OF THE PREFERRED EMBODIMENTS

Figure 1:
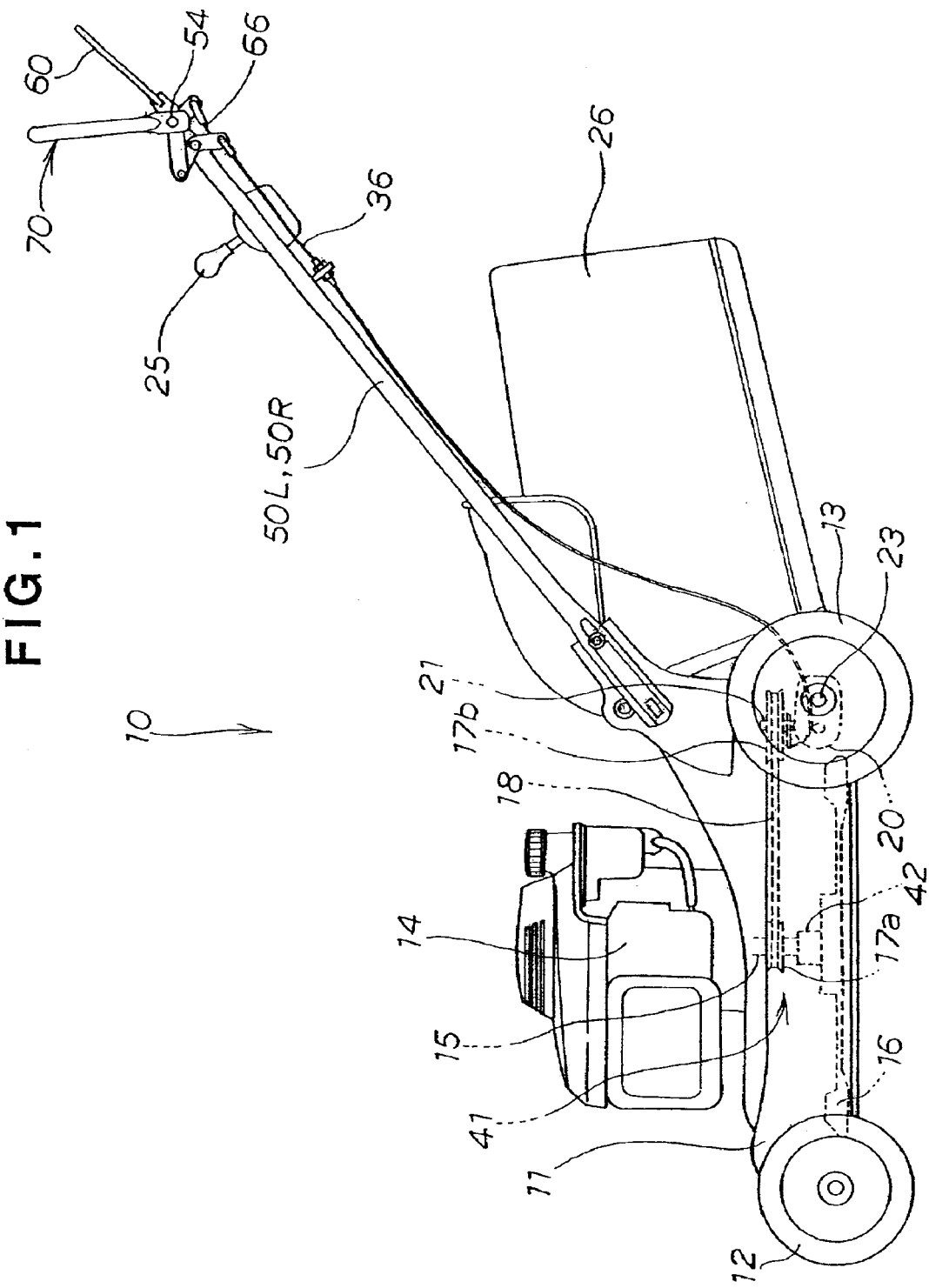
FIG. 1 is a left side elevation view illustrating a walk-behind working machine according to the present invention.

Referring to FIG. 1, a walk-behind working machine 10 such as a lawn mower includes a body 11 having a pair of right and left front wheels 12, 12 (only left one shown) positioned at a front part thereof. The body 11 has a pair of right and left rear wheels 13, 13 (running wheels) positioned at a rear part thereof. An engine 14 is provided at an upper part of the body 11. At a lower portion of a central part of the body 11, there is positioned a blade 16 for mowing grass 82 (see FIG. 6). The body 11 includes a transmission device 20 positioned inside a rear part thereof. The body 11 includes a pair of right and left handles 50L, 50R extending rearwardly therefrom. The body 11 is manipulated by means of these handles 50L, 50R.

The engine 14 is a drive source for driving the rear wheels 13, 13 and the blade 16. More specifically, the engine 14 includes a downwardly extending output shaft 15. The output shaft 15 is connected via a work switching clutch 42 to the blade 16. The output shaft 15 is also connected to an input shaft 21 through transmission components (a driving pulley 17a, a driven pulley 17b, and a belt 18).

The transmission device 20 is mounted in a power transmission system 41 including the engine 14 and the rear wheels 13, 13. The clutch 42, when in an off state (disengaged state), applies a brake to the blade 16.

Provided in the vicinity of a rear end of the left handle 50L of the working machine 10 is a lever 25 for controlling a throttle valve mounted to the engine 14. The right and left handles 50R, 50L have a work switching lever 60 and a grip clutch lever 70 attached to rear ends thereof through a support shaft 54. These levers 60, 70 are arranged to pivot in a front-and-rear direction of the machine 10.

The lever 60 has a wire cable 66 connected thereto. The clutch 42 is engaged or disengaged by the wire cable 66. Namely, while in an on state (engaged state), the clutch 42 transmits drive power from the engine 14 to the blade 16 to thereby drive the blade 16. While the clutch 42 is in the off state, on the other hand, the transmission of the drive power from the engine 14 to the blade 16 is cut off. More specifically, as an operator keeps his hands off from the lever 60, that is, the wire cable 66 is not pulled, the clutch 42 is held in the off state and the blade 16 brakes. When the operator pulls the wire cable 66 using the lever 60, the clutch 42 is brought to the on state to thereby transmit the drive power from the engine 14 to the blade 16.

The grip clutch lever 70 serves both as a grip the operator grips for manipulation of the body 11 and as a lever for operating a traveling clutch 30 as will be discussed later. The clutch 30 has a wire cable 36 connected thereto. The clutch 30 is engaged or disengaged using the lever 70. Namely, while in an engaged state (an on state), the clutch 30 transmits the drive power from the engine 14 to the rear wheels 13, 13 to thereby drive the rear wheels 13, 13. While the clutch 30 is in a disengaged state (an off state), on the other hand, the transmission of the drive power from the engine 14 to the rear wheels 13, 13 is cut off. More specifically, as the operator's hands are kept off from the lever 70, that is, the wire cable 36 is not pulled, the clutch 30 is in the disengaged state. When the wire cable 36 is pulled using the lever 70, the clutch 30 is brought to the engaged state to thereby transmit the drive power from the engine 14 to the rear wheels 13, 13.

As stated above, driving the engine 14 rotates the rear wheels 13, 13 and the blade 16. The front wheels 12, 12 then start to rotate. This causes the working machine 10 to travel mowing the grass 82. At this time, the operator walks behind the working machine 10, gripping and pushing the levers 60, 70. The working machine 10 includes a bag 26 for containing the mowed grass.

Figure 2:
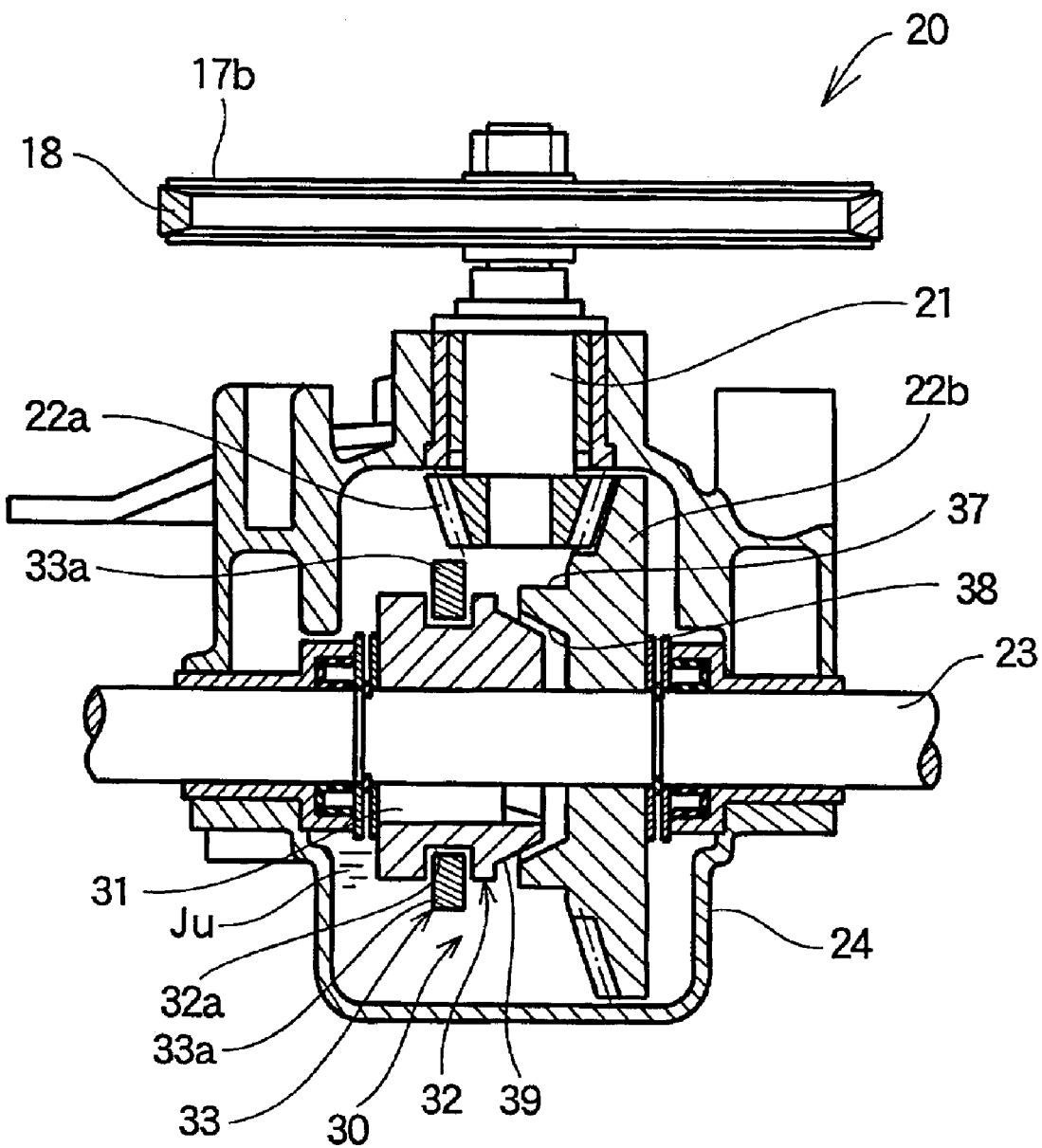
FIG. 2 is a cross-sectional view of a transmission device of the working machine including a traveling clutch according to the present invention.

Referring to FIG. 2, the transmission device 20 is shown including the traveling clutch 30.

The device 20 includes the input shaft 21 having the driven pulley 17b mounted at one end thereof. The input shaft 21 has a driving bevel gear 22a attached thereto. The gear 22a is of small diameter. A driven bevel gear 22b (a driving member) of large diameter meshes with the gear 22a. The gear 22b is rotationally mounted on an output shaft 23 extending laterally of the machine 10. As will be described later, the clutch 30 is arranged to transmit a driving force from the driven bevel gear 22b to the output shaft 23, or to cut off the transmission of the driving force. The gears 22a, 22b are accommodated within a case 24.

Within the case 24, the input shaft 21 and the output shaft 23 are rotatable and axially unmovable. The output shaft 23 is an axle of the rear wheels 13, 13. When supplied with the driving force from the gear 22b, the output shaft 23 transmits the same to the rear wheels 13, 13.

The traveling clutch 30 is a friction clutch including a driving member and a driven member. When the clutch 30 is in the engaged state, the driving force is transmitted to the output shaft 23 under the action of friction force produced between the driving member and the driven member. In the illustrated embodiment, the clutch 30 is a cone clutch.

The case 24 contains a lubricating oil Ju. The clutch 30 includes the bevel gear 22b having a tapered female portion 38 (a friction surface) and a clutch shifter 32 (a driven member) having a tapered male portion 39 (a friction surface). The bevel gear 22b and the clutch shifter 32 are disposed within the case 24 in such a manner as to be submerged in the oil Ju. The male portion 39 has its surface arranged to come into engagement with a surface of the female portion 38 when the clutch 30 is in the engaged state. The clutch 30 can also be used in a slipped state as will be discussed later. Whether the clutch 30 is switched from a disengaged state to the slipped state depends upon a surface pressure produced between the surfaces of the female and male portions 38, 39. The clutch 30 is interposed between the engine 14 and the rear wheels 13, 13. The phrase "surface pressure produced between the surfaces of the female and male portions 38, 39" used herein is referred to as a pressure one of the female and male portions 38, 39 held in contact with each other exerts on the other.

The tapered female portion 38 is formed at an end of a hub 37 of the bevel gear 22b. The clutch shifter 32 is mounted on the output shaft 23 in such a manner as not to rotate but slide with respect to the latter. The clutch shifter 32 has the tapered male portion 39 formed at an end thereof proximal to the female surface 38. The clutch shifter 32 has a circular grooved portion, or recessed portion 32a formed circumferentially thereof. A shift walk 33 has a pair of claws 33a, 33a fitted in the recessed portion 32a. A shifter rotation preventing member 31 is provided for keeping the clutch shifter 32 from rotating with respect to the output shaft 23. The lubricating oil Ju may have its any level below which the portions 38, 39 are in part placed.

Figure 3:
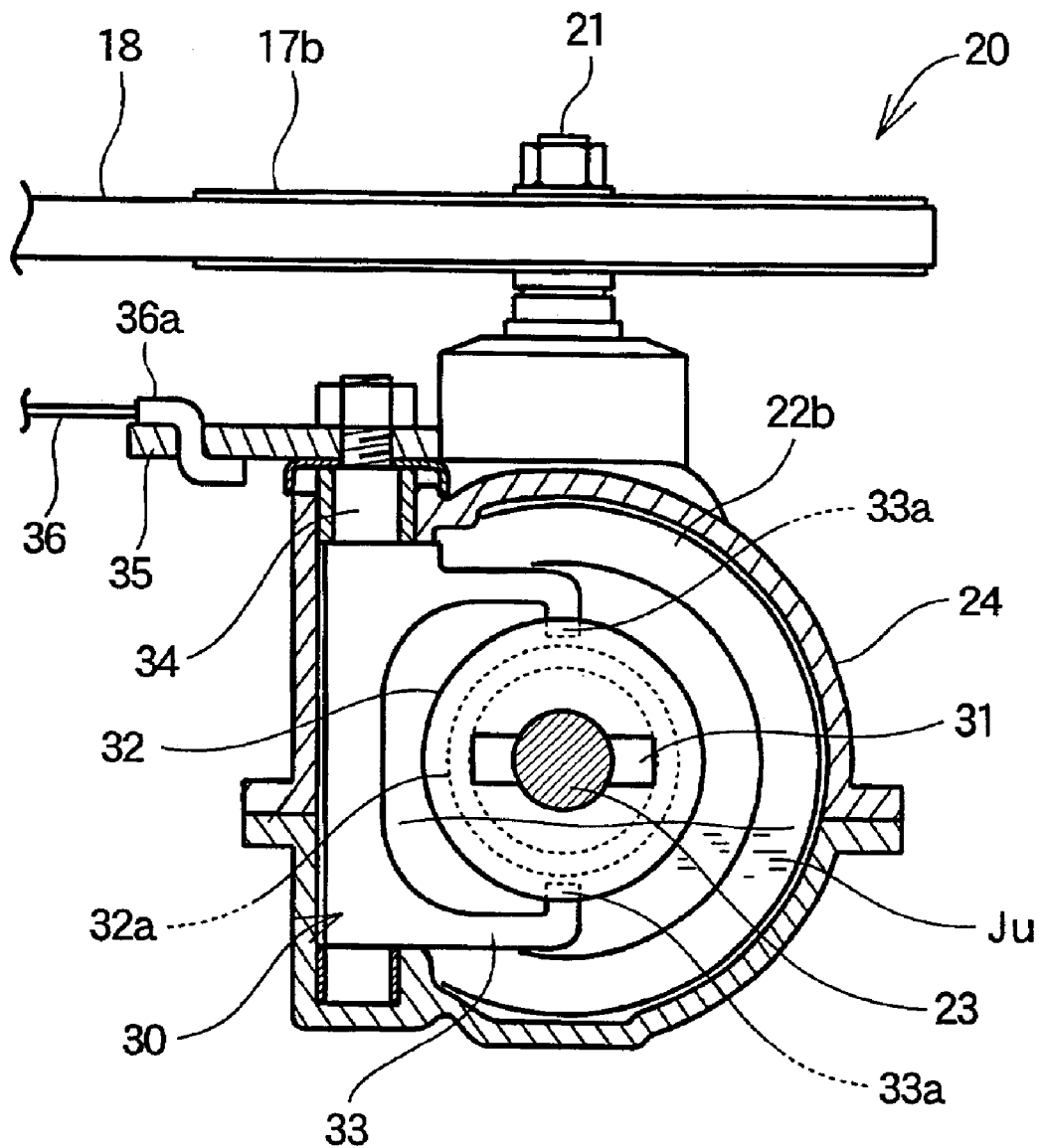
FIG. 3 is a cross-sectional view taken along line 3—3 of FIG. 2.

Turning to FIG. 3, the shift walk 33 is mounted within the case 24 in such a manner as to pivot in a direction perpendicular to this figure.

More specifically, the shift walk 33 is arranged to pivot on a support shaft 34. The support shaft 34 is rotatably mounted within the case 24. The support shaft 34 has a clutch lever 35 attached to one end thereof. The clutch lever 35 has its one end connected to a wire end 36a of the wire cable 36.

Figure 4:
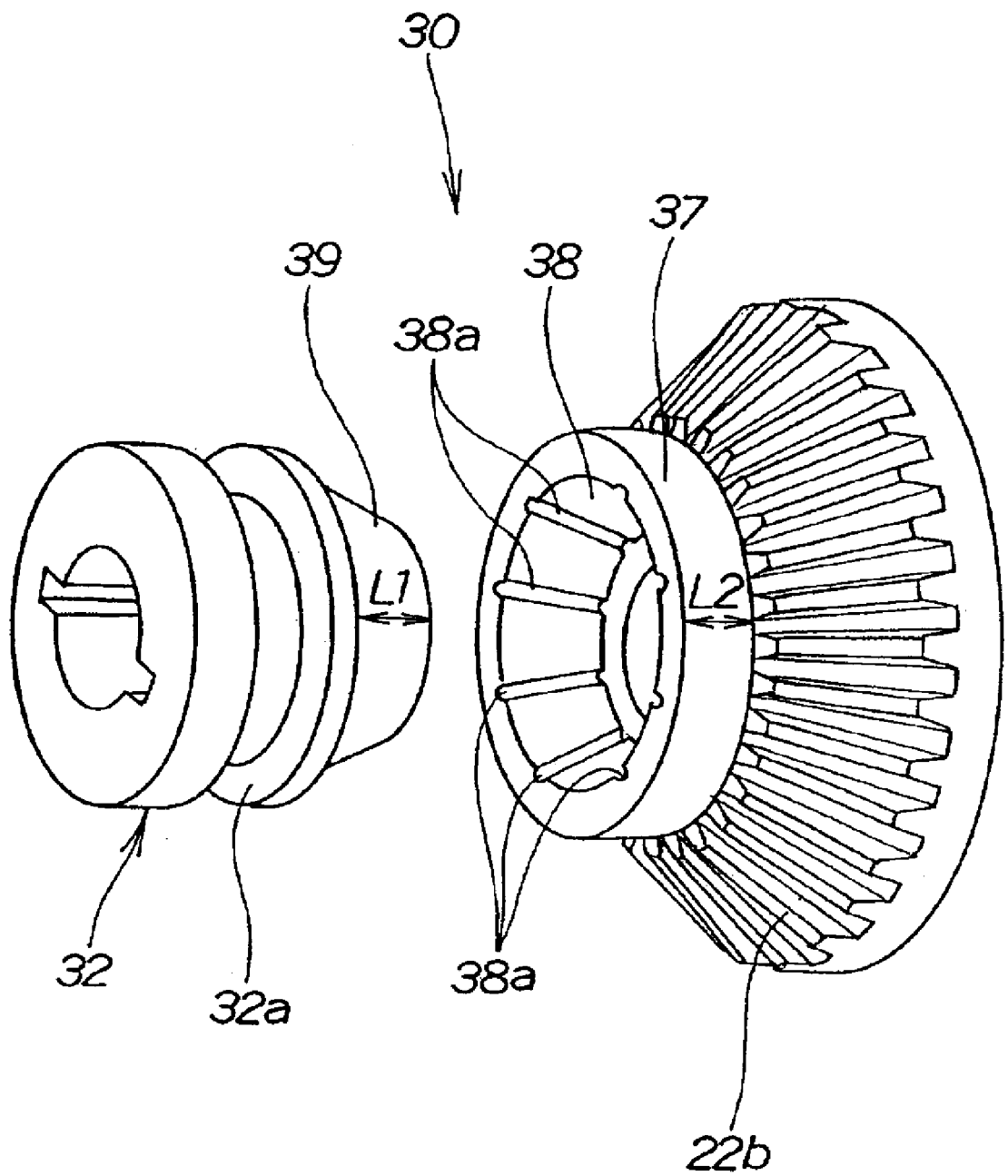
FIG. 4 is an exploded view showing a modified version of the traveling clutch shown in FIG. 2.

In FIG. 4, there are shown plural straight grooves 38a formed circumferentially of the surface of the female portion 38. The grooves 38a are spaced at given intervals. While the clutch 30 is in the slipped state where the male portion 39 slides over or slips on the female portion 38, the surfaces of the female and male portions 38, 39 wear away each other to thereby produce powder therebetween. At this time, edges forming the respective grooves 38a scrape the powder off. The powder is then discharged out of the grooves 38a. The grooves 38a extend across the surface of the female portion 38, and have semicircular or U-shaped contours as viewed in front elevation. The grooves 38a may be spaced at different intervals, and have variety of widths, sizes, and any cross-sectional contours to serve the above function. The surface of the female portion 38 may be free from the grooves 38a.

Referring back to FIG. 2 and FIG. 3, the clutch 30 is shown as being in the disengaged state where the bevel gear 22b does not contact the clutch shifter 32.

When the wire cable 36 is pulled, the shift walk 33 is caused to pivot towards the driven bevel gear 22b (in a direction directed down and out of the plane of FIG. 3). Consequently, the claws 33a, 33a of the shift walk 33 are also shifted to cause the clutch shifter 32 to slide towards the bevel gear 22b.

The sliding movement of the clutch shifter 32 towards the bevel gear 22b brings the male portion 39 into contact with the female portion 38. More specifically, the surfaces of the female and male portions 38, 39 contact each other to thereby produce a friction therebetween, such that the clutch 30 transmits the driving force to the output shaft 23.

A pulling force by which the wire cable 36 is pulled is changed in correspondence to a change in a pushing force by which the grip clutch lever 70 is pushed. A force by which the clutch shifter 32 is slid into contact with the bevel gear 22b is thus changed. As a result, there is changed a surface pressure produced between the surface of the male portion 39 and the surface of the female portion 38. Therefore, there is also changed a friction force produced between the surfaces of the female and male portions 38, 39. With this arrangement, the clutch 30 can be switched from the disengaged state through the slipped state to the engaged state.

Figure 5:
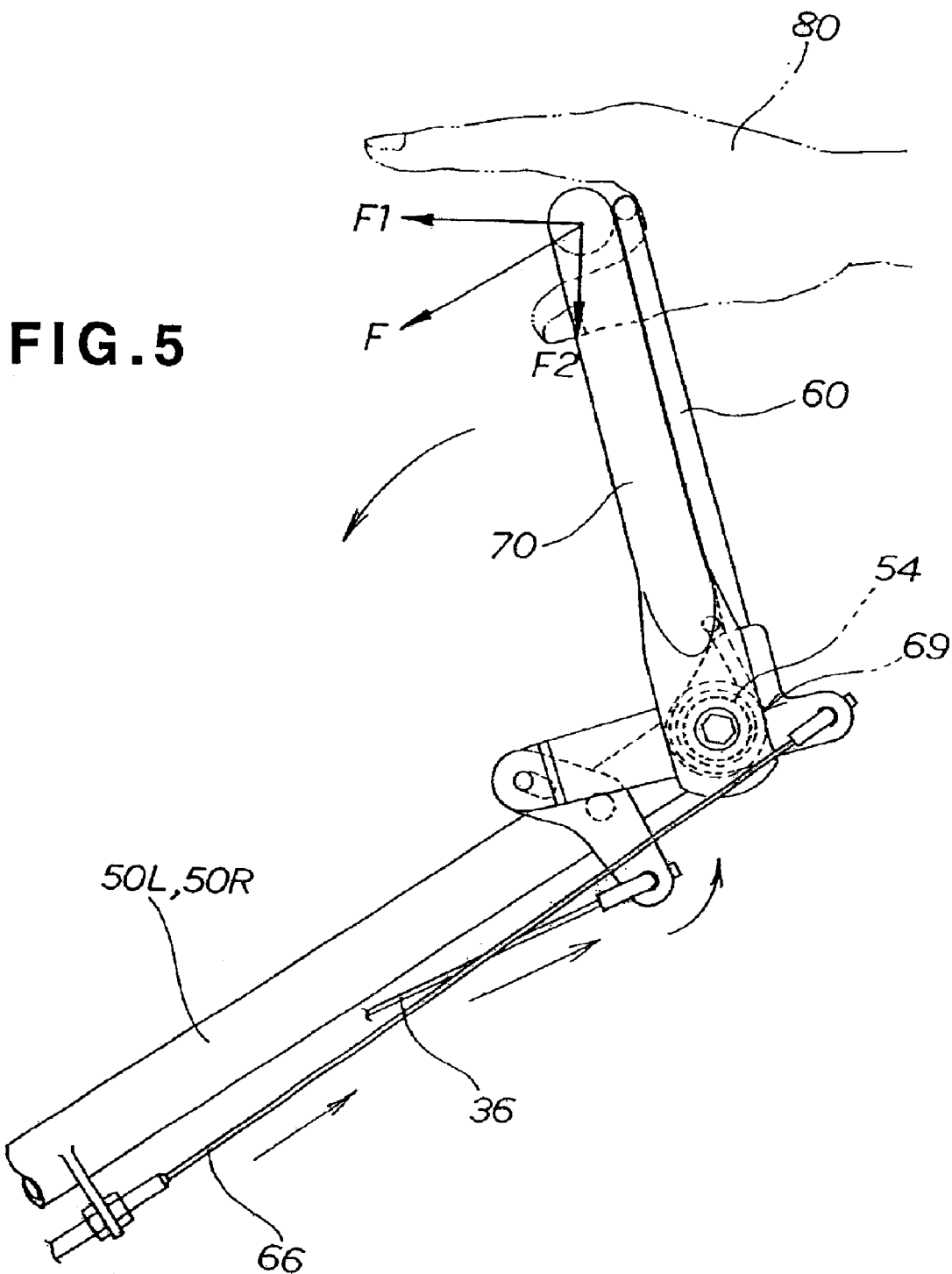
FIG. 5 is a view illustrating how a grip clutch lever is operated.

With respect to FIG. 5, the work switching lever 60 is shown as being turned forwardly into abutment on the grip clutch lever 70. The abutment of the lever 60 on the lever 70 pulls the wire cable 66. The work switching clutch 42 is then brought to the on state to thereby transmit the drive power of the engine 14 to the blade 16. The blade 16 is therefore driven to mow the grass. A return spring 69 produces a force by which the grip clutch lever 70 is held in a neutral position, as shown in FIG. 5.

When the operator pushes the levers 60, 70 forwardly by his/her hand 80, a resultant force F including a horizontally forward force F1 and a vertically downward force F2 is exerted on the lever 70 in a direction as indicated by an arrow. The force F1 acts to push the lever 70 horizontally while the force F2 is due to the weight of the hand 80.

A direction of the resultant force F1 is substantially the same as a direction of the forward pivotal movement of the lever 70 on the support shaft 54. It thus becomes possible to efficiently turn the lever 70 counterclockwise by pushing the same with the force F1. More specifically, the wire cable 36 is pulled by an amount of the pivotal movement of the lever 70. In other words, the change in the amount by which the wire cable 36 is pulled depends upon the force F1.

The work switching lever 60 is arranged to pivot on the support shaft 54 together with the grip clutch lever 70.

The surface pressure between the female portion 38 and the male portion 39 is changed depending upon the pulling force for pulling the wire cable 36. If the pulling force is small, the clutch 30 is brought to the slipped state. When the clutch 30 is in the slipped state, the working machine begins to travel at a small velocity.

Figure 6:
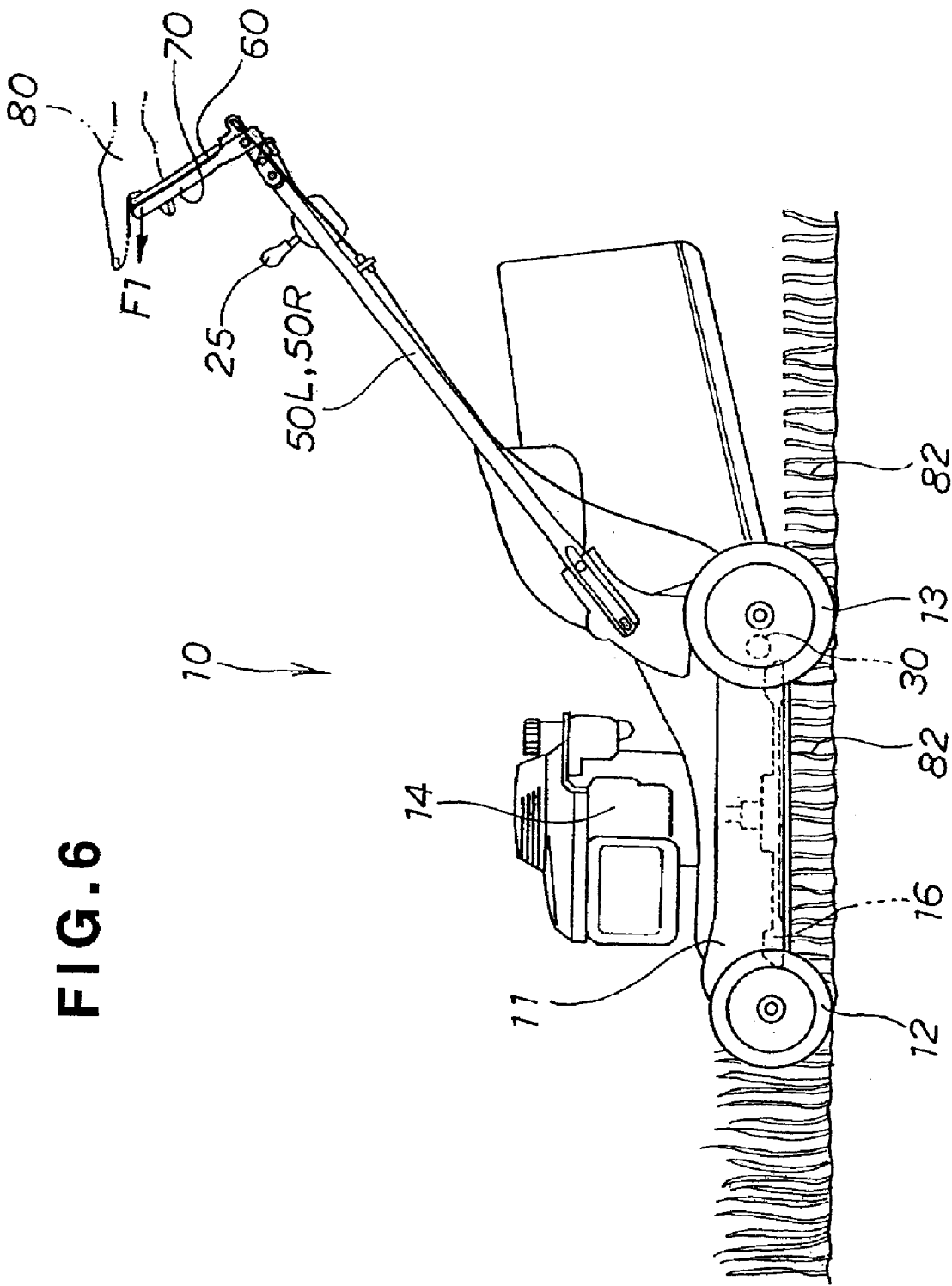
FIG. 6 is a view illustrating the working machine mowing grass with the grip clutch lever gripped by an operator's hand.

In relation to FIG. 6, the working machine 10 begins to travel slowly with the clutch 30 held in the slipped state, as stated above. Thus, the operator can start to propel the working machine 10 with smoothness with the result that the grass 82 is mowed well.

The operator's hand 80 further pushes the levers 60, 70 forwardly with the horizontally forward force F1. The force F1 is directed in the direction of the propulsion of the working machine 10. This is advantageous because the operator tirelessly manipulates the traveling working machine 10 performing the mowing operation.

As the operator pushes the grip clutch lever 70 forwardly to such an extent as to bring the clutch 30 to the slipped state, the working machine 10 begins to travel. Thereafter, the operator can walk behind the working machine 10, manipulating the same with ease.

In turning or retracting the working machine 10, the operator stops exerting the force F1 on the levers 60, 70. The return spring 69 then forces the levers 60, 70 to pivot back to their neutral positions as shown in FIG. 1. Consequently, the clutch 30 is brought to the disengaged state to thereby supply the rear wheels 13, 13 with no drive power of the engine 14.

This enables the operator to turn or retract the working machine 10, gripping the levers 60, 70.

The clutch 30 transmits from the engine 14 to the rear wheels 13, 13 the drive power corresponding to the forward force F1 exerted on the grip clutch lever 70. The working machine 10 is thus propelled by the operator-produced small force F1 and the large drive power transmitted from the engine 14 via the clutch 30 to the rear wheels 13, 13. In other words, the working machine 10 can be propelled with the aid of the drive power.

The working machine 10 is easy to handle because the operator is required only to push the grip clutch lever 70 by hand, as is conventional, in propelling the working machine 10.

Figure 7B:
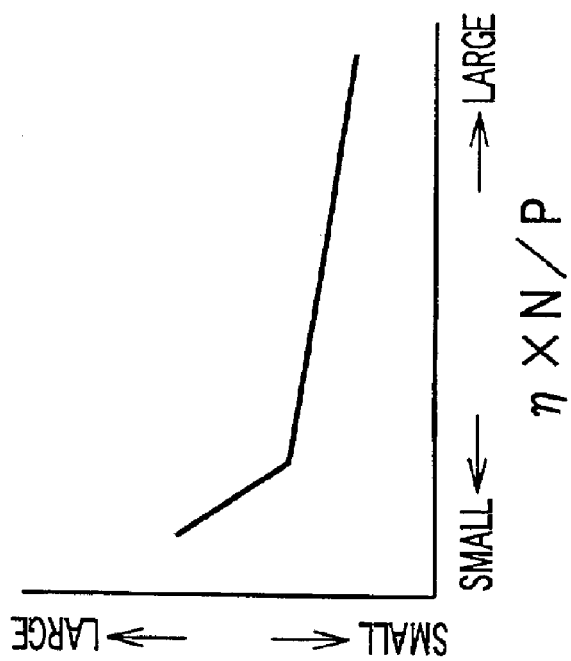
FIG. 7A is a schematic view illustrating how the traveling clutch is operated, and FIG. 7B graphically shows the dependency of a coefficient of friction between female and male members of the traveling clutch on a surface pressure between the female and male members.
Figure 7A:
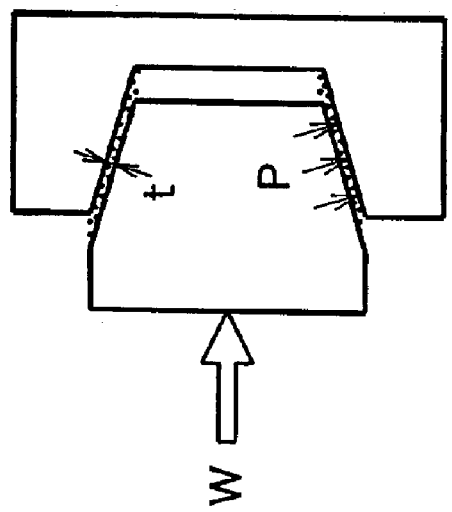

As shown in FIG. 7A, the clutch 30 includes the tapered female portion 38 and the tapered male portion 39. Whether the clutch 30 is switched from the disengaged state to the slipped state depends on the surface pressure between the surfaces of the female and male portions 38, 39. A film made of the lubricating oil Ju is interposed between the surfaces of the female and male portions 38, 39. A surface pressure P exerted on the surface of the female portion 38 by the male portion 39 is changed in correspondence to a pressing force W by which the surface of the male portion 39 is pressed against the surface of the female portion 38. The change in the surface pressure P varies a thickness t of the film. A relation between the surface pressure P and the thickness t is shown in the following table 1.

TABLE 1

| $\eta \times N$ | SURFACE PRESSURE | THICKNESS OF LUBRICATING OIL FILM | COEEFICIENT OF FRICITON | $(\eta \times N)/P$ |
| --- | --- | --- | --- | --- |
| CONST. | SMALL | LARGE | SMALL | LARGE |
|  | LARGE | SMALL | LARGE | SMALL |

As is apparent from the above table 1, when the surface pressure P is small, the thickness t of the film is made large. The large thickness t provides decreased coefficient of friction $\mu$ between the surfaces of the female and male portions 38, 39. When the surface pressure P is large, on the other hand, the thickness t becomes small. The small thickness t provides increased coefficient of friction $\mu$.

A characteristic of the clutch 30 can be evaluated using a parameter represented by a reference character $(\eta \times N)/P$, where P is the surface pressure (Pa), $\eta$ is a viscosity (Pa.s) of the lubricating oil Ju, and N is a difference in the number of rotations per second between the male portion 39 and the female portion 38. N is, namely, the number of times (1/s) the male portion 39 rotates relative to the female portion 38 per second when the clutch 30 is in the slipped clutch. The parameter $(\eta \times N)/P$ is dimensionless. With $\eta \times N$ kept constant, when the surface pressure P is small, the parameter $(\eta \times N)/P$ is large while when the surface pressure P is large, the parameter $(\eta \times N)/P$ is small.

When the parameter $(\eta \times N)P$ is large, the coefficient of friction $\mu$ is small while when the parameter $(\eta \times N)/P$ is small, the coefficient of friction $\mu$ is large.

FIG. 7B graphically shows the relation between the coefficient of friction g and the parameter $(\eta \times N)/Pas$ indicated in the table 1. As shown FIG. 7B, there are provided a coordinate system including a horizontal axis showing the parameter $(\eta \times N)/P$ and a vertical axis showing the coefficient of friction $\mu$ corresponding to the parameter $(\eta \times N)/P$. When shown in the coordinate system, the relation between the coefficient of friction $\mu$ and the parameter $(\eta \times N)/P$ provides a line graph including two straight lines of negative slope, as will be discussed in detail with respect to FIG. 8.

FIG. 8 is a graph based on data obtained from an experiment in which the coefficients of friction $\mu$ were measured at the various parameters.

As can be seen from FIG. 8, the clutch 30 provides a characteristic curve shown in a coordinate system including a horizontal axis showing the parameter $(\eta \times N)/P$ and a vertical axis showing the coefficient of friction. The characteristic curve of the clutch 30 is called "Stribeck curve".

Since the viscosity $\eta$ of the lubricating oil and the difference in the number of rotations N vary much less than the surface pressure, the product $\eta \times N$ is considered constant. Therefore, the parameter $(\eta \times N)/P$ is inversely proportional to the surface pressure P.

The stribeck curve of FIG. 8 provides three states: (1) Boundary lubrication state where the surface pressure P is large to thereby lessen the parameter $(\eta \times N)/P$ and thin the film of the lubricating oil interposed between the surfaces of the female and male portions 38, 39, so that the coefficient of friction $\mu$ is large; (2) Mixed lubrication state where as the surface pressure P is reduced, the parameter $(\eta \times N)/P$ is increased and the film of the lubricating oil is thickened, so that the coefficient of friction $\mu$ is decreased; and (3) Hydrodynamic lubrication state where as the surface pressure P is further reduced, the parameter $(\eta \times N)/P$ is further increased and the film of the lubricating oil becomes sufficiently thick, so that the coefficient of friction $\mu$ is made small.

The mixed lubrication state is a mixture of the boundary lubrication state and the hydrodynamic lubrication state. In the hydrodynamic lubrication state, the surface of the male portion 39 is completely kept off from the surface of the female portion 38 to ensure that the film of the lubricating oil is interposed therebetween.

The stribeck curve as shown in FIG. 8 is approximated to the two straight lines on the basis of data obtained from the experiment performed on the clutch 30 under the following condition:

average diameters of the tapered female and male portions 38, 39; 40 (mm)

lengths L1, L2 (see FIG. 4) of the tapered female and male portions 38, 39; 7 (mm)

angles the surfaces of the female and male portions 38, 39 are inclined: 12 (deg.)

surface roughness of the surfaces of the female and male portions 38, 39: 0.1 to 1.0 ($\mu$m)

material for the female portion 38: casting of aluminum bronze material for the male portion 39: sintered iron-based metal lubricating oil: engine oil viscosity of the lubricating oil $\eta$: 0.055 (Pa.s)

the difference N in the number of rotations per second between the male portion 39 and the female portion 38: 1.7 to 5.0 (1/s)

the surface pressure P between the surfaces of the female and male portions 38, 39: $5 \times 10^6$ to $70 \times 10^6$ (Pa)

The stribeck curve of FIG. 8 is approximated to the two straight lines, that is, first and second straight lines C1, C2. The first straight line C1 meets the second straight line C2 at a bent point Cp. The first straight line C1 is inclined more than the second straight line C2. At the point Cp, the parameter $(\eta \times N)/P$ is $5 \times 10^{-8}$ and the coefficient of friction $\mu$ is 0.07. The steep first straight line C1 is in a first region A having any point at which the parameter $(\eta \times N)/P$ is smaller than $5 \times 10^{-8}$ to thereby provide the boundary lubrication state. The gently sloped second straight line C2 is in a second region B having any point at which the parameter $(\eta \times N)/P$ is larger than $5 \times 10^{-8}$ to thereby provide the mixed lubrication state or hydrodynamic lubrication state.

As can be seen from this graph, at the bent point Cp, the first straight line C1 having the parameters $(\eta \times N)P$ smaller than $5\times10^{-8}$ meets the second straight line C2 having the parameters $(\eta\times N)/P$ larger than $5\times10^{-8}$.

The stribeck curve discussed above corresponds to the pivotal movement range of the grip clutch lever. More specifically, the bent point Cp corresponds to a switch point when the working machine 10 is switched between a high load running state (a first state) and a low load running state (a second state), as will be described in detail below. The statement "high load running state" as used herein means a state in which the working machine 10 runs at a high load. Likewise, the statement "low load running state" as used herein means a state in which the working machine runs at a low load.

When the working machine 10 runs at high load, the parameter $(\eta\times N)/P$ is smaller than $5\times10^{-8}$. On the other hand, when the working machine 10 runs at low load, the parameter $(\eta\times N)/P$ is larger than $5\times10^{-8}$.

Since the parameter $(\eta\times N)/P$ is smaller than $5\times10^{-8}$ when the working machine is under high load running, the coefficient of friction between the surfaces of the female and male portions is large. It is therefore noted that when the pushing force of small magnitude that pushes the grip clutch lever 70 even slightly increases, there is greatly improved a transmission ability of the clutch 30 to transmit the drive power from the engine 14 to the rear wheels 13, 13.

Since the parameter $(\eta\times N)/P$ is larger than $5\times10^{-8}$ when the working machine is under low load running, the coefficient of friction between the surfaces of the female and male portions is small. The transmission ability of the clutch 30 remains substantially unchanged without being affected by slight change in the pushing force.

If the bent point Cp were smaller than $5\times10^{-8}$, the second straight line C2 of small coefficient of friction between the surfaces of the female and male portions 38, 39 would be lengthened. This means that the transmission ability of the clutch 30 is not improved even when the working machine 10 is required to travel at the high load. Consequently, the clutch undesirably fails to transmit to the rear wheels 13, 13 a required drive power corresponding to the pushing force by which the grip clutch lever 70 is pushed.

If the bent point Cp were larger than $5\times10^{-8}$, there would be lengthened the first straight line C1 having the coefficient of friction greatly changed in correspondence to change in the pushing force. Namely, the transmission ability of the clutch 30 is undesirably greatly changed in correspondence to any change in the pushing force. With this arrangement, the working machine travels far less smoothly.

According to the present invention, the parameter at bent point Cp is $5\times10^{-8}$. This is advantageous because the working machine 10 smoothly travels at both the high and low loads.

Figure 9:
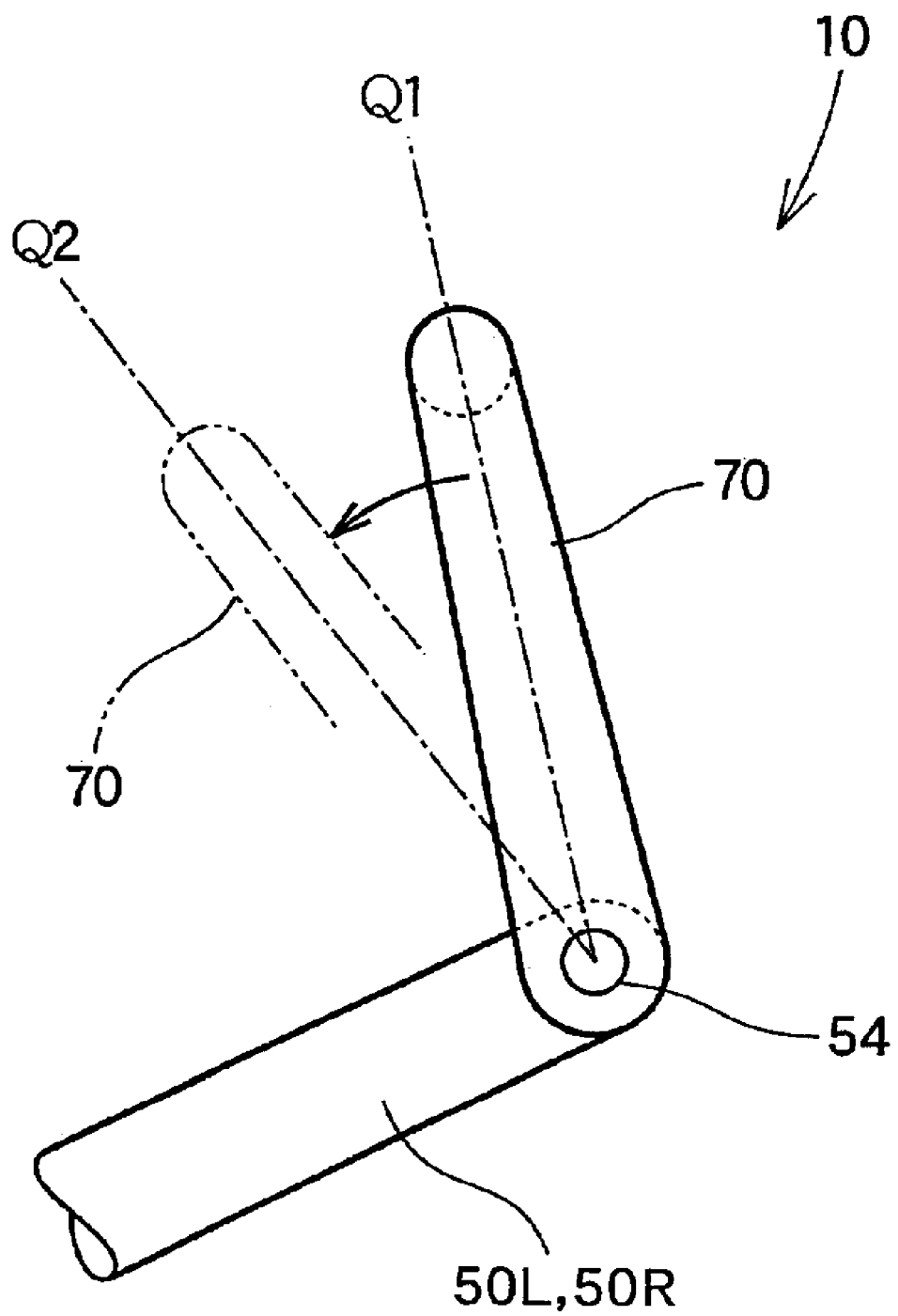
FIG. 9 is a view illustrating the grip clutch lever pivoted from a neutral position to a fully pivoted position.

Referring to FIG. 9, the grip clutch lever 70 is shown undergoing pivotal movement on the support shaft 54.

With the grip clutch lever 70 in a neutral position Q1, the clutch 30 is in the disengaged state. The working machine 10 is kept from traveling. When pushed forwardly with the forwardly-directed pushing force, the grip clutch lever 70 is caused to forwardly pivot to a fully pivoted position Q2 on the support shaft 54.

With the lever 70 pivoted to the fully pivoted position Q2, the clutch 30 is brought to the slipped state.

The operator adjusts his/her exertion of the pushing force on the lever 70 in the position Q2. As discussed above, the pulling force which pulls the wire cable 36 changes in correspondence to the pushing force acting on the lever 70. Change in the pushing force varies the surface pressure between the surfaces of the female and male portions 38, 39.

It is thus noted that the surface pressure between the surfaces of the female and male portions 38, 39 is varied in correspondence to the pushing force applied to the lever 70 in the fully pivoted position Q2. When the pushing force is small, the surface pressure is small, too. When the pushing force is made large, the surface pressure also becomes large.

As the working machine 10 travels at the low load, for example, the machine 10 runs on a flat ground, a pushing force with which the operator pushes the grip clutch lever 70 in the fully pivoted position Q2 is small. Thus, the surface pressure between the surfaces of the tapered female and male portions 38, 39 is small. More specifically, when the working machine 10 travels on the flat ground, the surface pressure is set such that the parameter $(\eta\times N)/P$ becomes larger than $5\times10^{-8}$ to thereby make the coefficient of friction small, as shown in FIG. 8.

The second straight line C2 of the stribeck curve lying in the second region B having the parameter $(\eta\times N)/P$ larger than $5\times10^{-8}$ is a gentle slope, as can be seen from FIG. 8. Accordingly, even when the pushing force that pushes the lever 70 is greatly changed, the transmission ability of the clutch 30 is substantially unchanged. In other words, it is unlikely that the transmission ability of the clutch 30 is changed by slight change in the pushing force. The smooth traveling of the working machine 10 can be therefore achieved.

As the working machine 10 travels at the high load, for example, the machine 10 runs on a sloped ground, the pushing force with which the operator pushes the grip clutch lever 70 in the fully pivoted position Q2 is large. The surface pressure between the surfaces of the tapered female and male portions 38, 39 is therefore rendered large. More specifically, when the working machine 10 travels on the sloped ground, the surface pressure is set such that the parameter $(\eta\times N)/P$ becomes smaller than $5\times10^{-8}$ to thereby make the coefficient of friction large, as shown in FIG. 8.

The first straight line of the stribeck curve lying in the first region A having the parameter $(\eta\times N)/P$ smaller than $5\times10^{-8}$ is a sharp slope. Accordingly, even slight change in the force that pushes the grip clutch lever 70 greatly improves or reduces the transmission ability of the clutch 30.

The surface pressure between the surfaces of the tapered female and male portions 38, 39 is determined such that the bent point Cp corresponds to a switch point when a running load (kgf) under which the working machine 10 travels is switched from the high load to the low load, or vice versa. The term "running load" as used herein means a load or resistance the traveling working machine undergoes.

Namely, the operator determines his/her pushing force that pushes the grip clutch lever 70 in the fully pivoted position Q2, so that the bent point Cp corresponds to a switch point when the working machine 10 is switched between the low load running state and the high load running state.

The pushing force on the lever 70 in the position Q2 is used to: (1) control the clutch 30 in the slipped state; (2) produce a mechanical loss when the clutch 30 is brought into operation with the lever 70; and (3) overcome a force exerted by the return spring 69. The mechanical loss and the force exerted by the return spring are relatively small.

Figure 10:
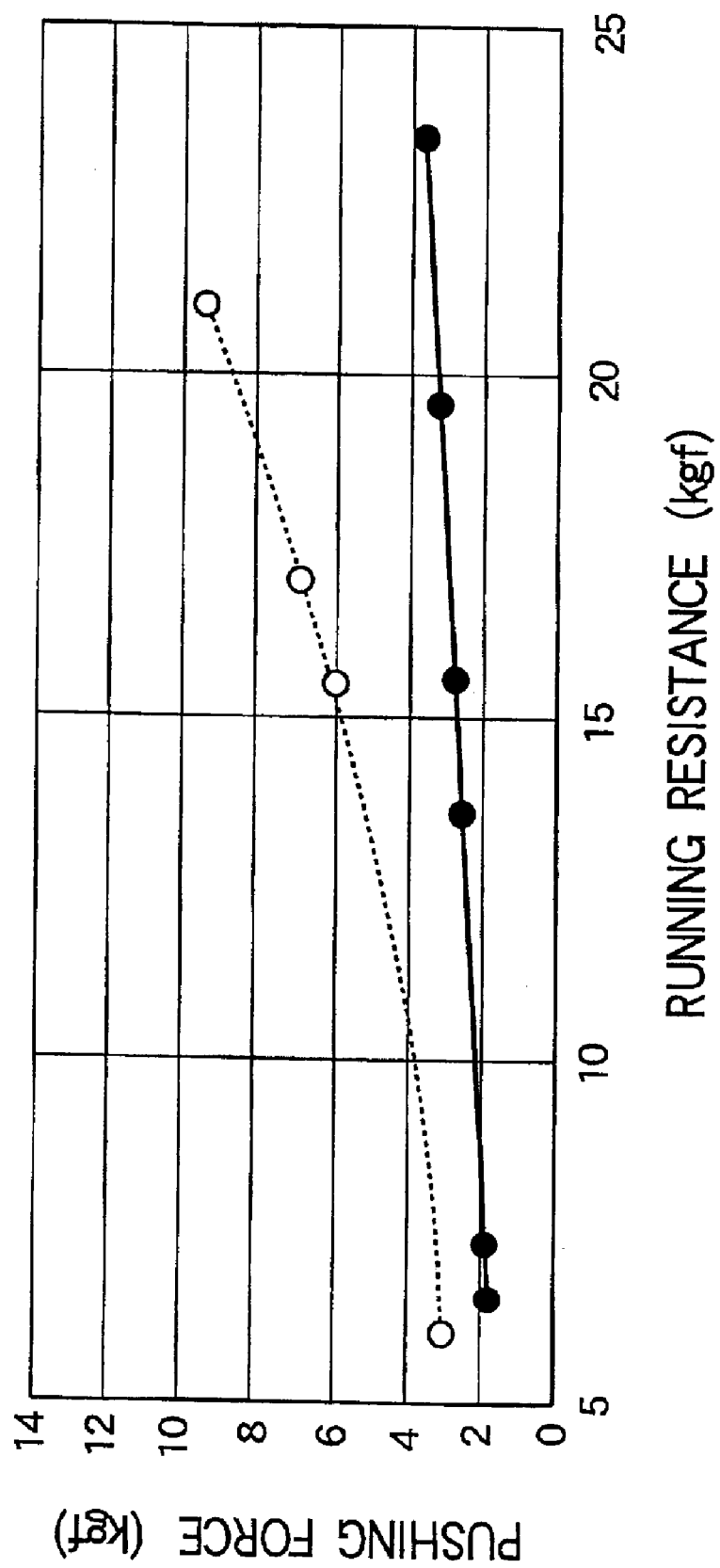
FIG. 10 is a graphical representation of a pushing force exerted on the grip clutch lever at various running resistance to propulsion of the working machine when the working machine employs the traveling clutch (solid circles and a solid line) and when the working machine employs a belt slip clutch (open circles and a broken line)
Figure 11:
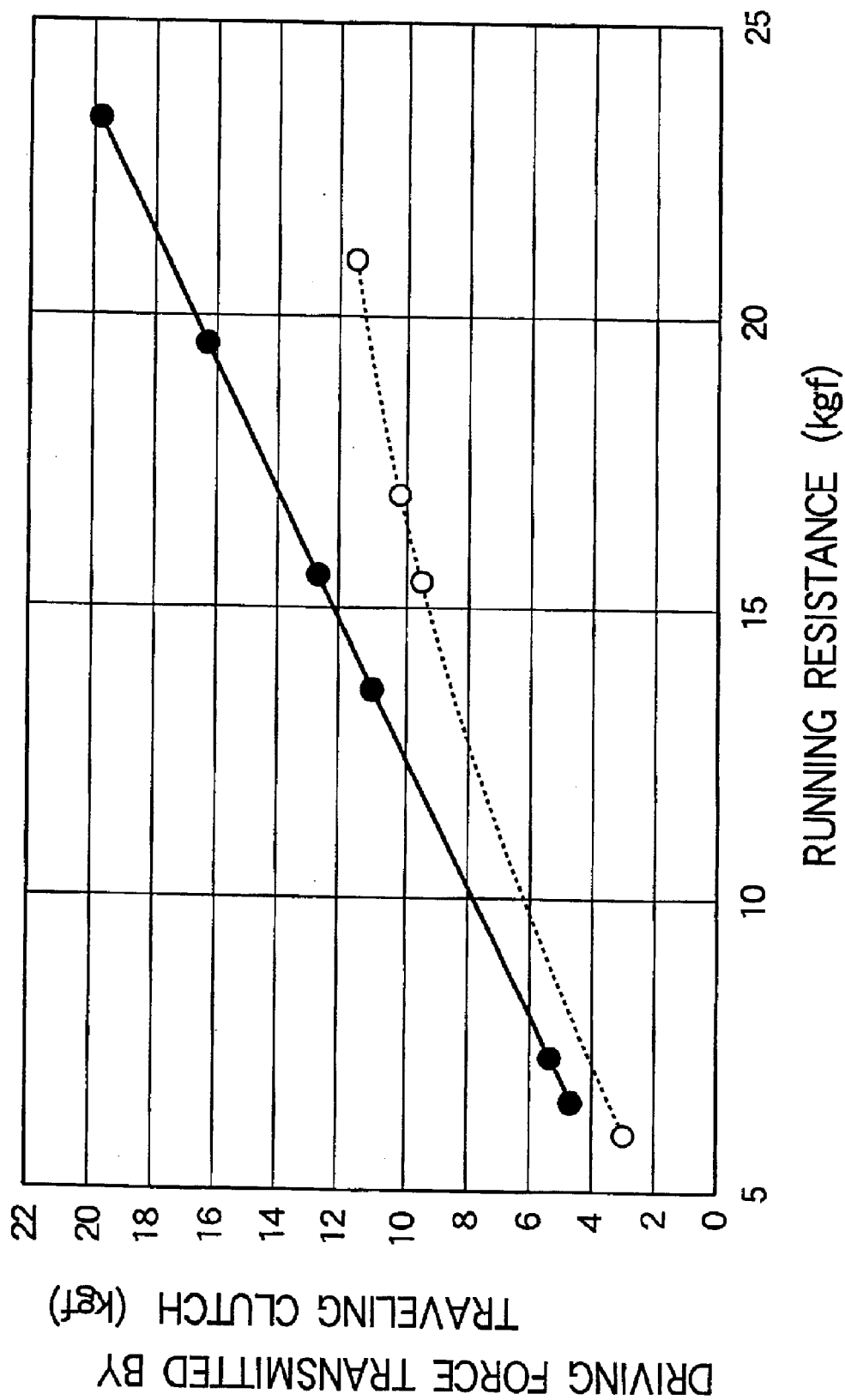
FIG. 11 is a graphical representation of driving force transmitted by the belt slip clutch (open circles and a broken line) and the traveling clutch (solid circles and a solid line) at the various running resistance.
Figure 12:
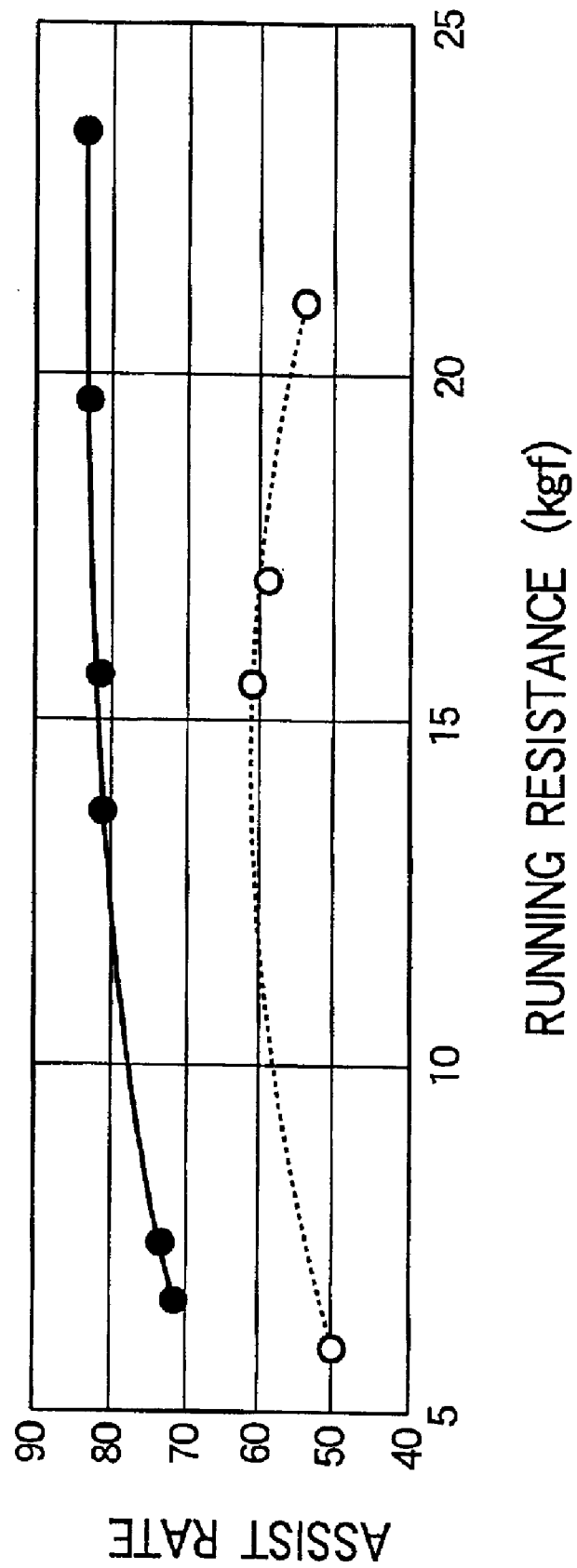
FIG. 12 is a graphical representation of assist rates of the belt slip clutch (open circles and a broken line) and the traveling clutch (solid circles and a solid line) at the various running resistance.

Reference is made to FIG. 10 to FIG. 12 graphically showing how the clutch 30 is advantageous over a belt slip clutch. The belt slip clutch includes a driving pulley, a driven pulley, and a belt running over the driving and driven pulleys.

There was provided a different type of working machine. Such a working machine differs from the working machine 10 in that the belt slip clutch rather than the clutch 30 is employed therein. Tension in the belt is varied in correspondence to a pushing force that pushes the grip clutch lever 70.

The clutch 30 of the present invention and the belt slip clutch were used under the same condition.

In FIG. 10, there are provided a coordinate system having a horizontal axis showing a running resistance (i.e., the running load) (kgf) to the traveling working machine 10, and a vertical axis showing the pushing force (kgf) that pushes the grip clutch lever.

For the belt slip clutch, as the load at which the working machine travels becomes high, the pushing force increases, as indicated by open circles and a broken line. More specifically, when the running resistance is 6 kgf, the pushing force is 3 kgf. The running resistance of 21 kgf provides the pushing force as many as 9 kgf. The pushing force is thus tripled. As the running resistance further increases, the pushing force abruptly increases. It is very hard for the operator to exert the pushing force as large as 9 kgf or more.

For the clutch 30 of the present invention, however, even when the working machine 10 travels at the high load, the pushing force increases only a small amount, as shown by solid circles and a solid line. More specifically, when the running resistance is 6.5 kgf, the pushing force is 1.8 kgf. The running resistance of 23.5 kgf provides the pushing force of 3.6 kgf. The pushing force increases only twice. It is to be noted that the pushing force remains substantially constant regardless of the increase in the running resistance. The maximum pushing force is in the order of 4 kgf and hence is easy for the operator to exert.

In FIG. 11, there are provided a coordinate system having a horizontal axis showing the running resistance (kgf) to the working machine, and a vertical axis showing the driving force (kgf) the clutch transmits to the rear wheels of the working machine.

For the belt slip clutch, as indicated by open circles and a broken line, the driving force does not exceed about 12 (kgf) no matter how large the running resistance becomes. That is, a maximum driving force is as small as 12 (kgf).

For the clutch of the present invention, as shown by solid circles and a solid line, the driving force substantially linearly increases with the running resistance.

In FIG. 12, there are provided a coordinate system having a horizontal axis showing the running resistance (kgf) to the working machine, and a vertical line showing an assist rate, expressed in terms of percent (%), indicating how much the drive source assists the operator in propelling the working machine 10.

The assist rate is obtained by dividing the driving force by the running resistance. Namely, the assist rate may be construed as an efficiency with which the clutch 30 transmits the driving force to the rear wheels when the working machine 10 travels under the running load. The operator should produce a force corresponding to a value (%) obtained by subtracting the assist rate from 100 (%).

For the belt slip clutch, as indicated by open circles and a broken line, the assist rate does not exceed about 63 (%) no matter how large the running resistance becomes. In other words, a maximum assist rate is as low as 63 (%). The operator should therefore produce a force corresponding to the remaining 37% or more. This results in increased burden on the operator.

For the clutch 30 of the present invention, as indicated by solid circles and a solid line, the assist rate is kept high irrespective of the running resistance. More specifically, when the running resistance is in the range of 6.5 to 23.5 (kgf), the assist rate is as high as 70 to 85 (%). This results in reduced burden on the operator.

With respect to FIG. 10 through FIG. 12, the use of the clutch 30 is advantageous, for example, because: (1) when the working machine 10 travels undergoing the small running resistance of 6.5 (kgf), the assist rate is 70 (%) to thereby require the operator to push the grip clutch lever 70 with a small pushing force of 1.8 (kgf); and (2) when the working machine travels undergoing the large running resistance of 23.5 (kgf), the assist rate is 85 (%) to thereby require the operator to push the grip clutch lever 70 with a pushing force of 3.6 (kgf).

Figure 13:
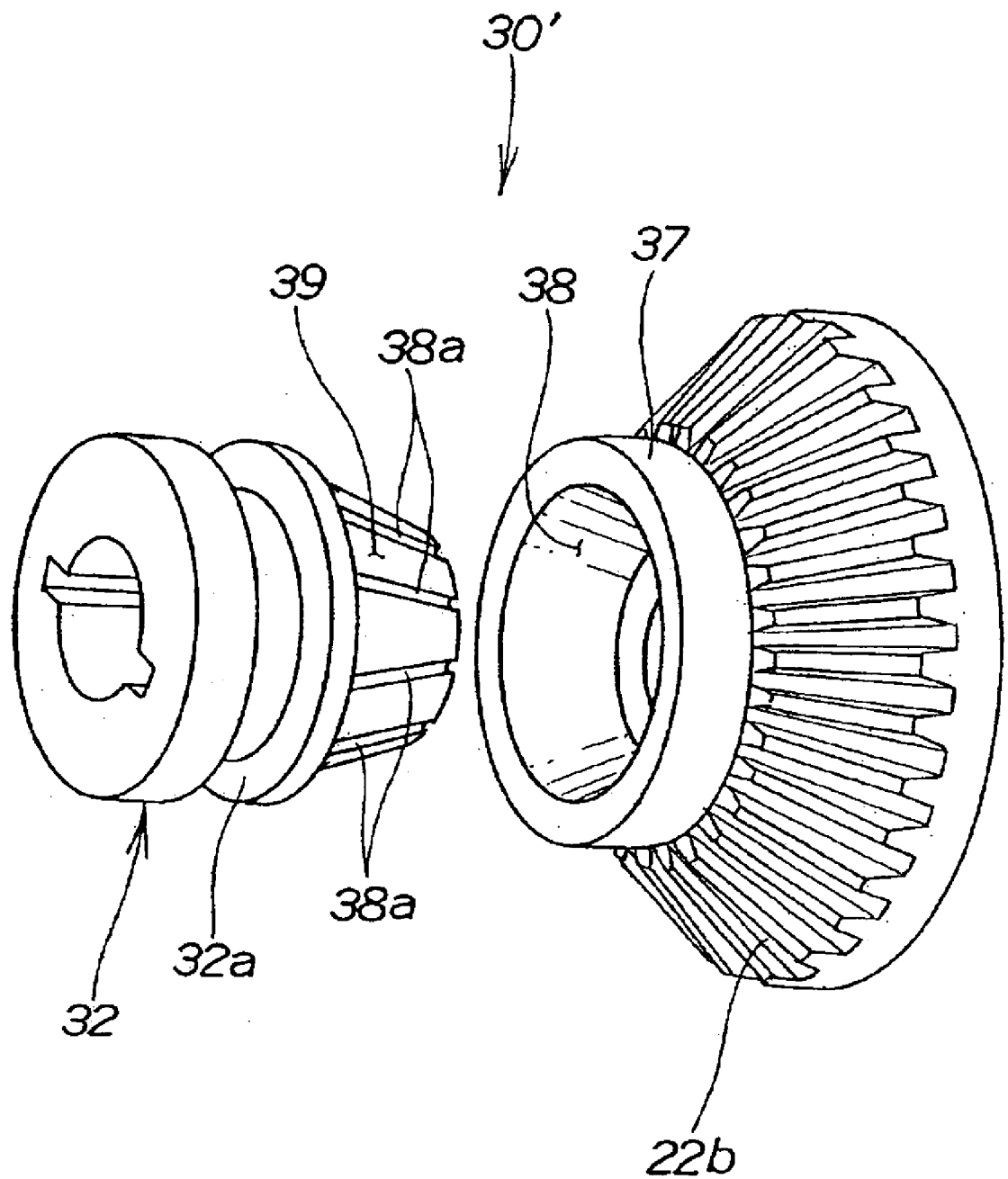
FIG. 13 is a view illustrating a modified traveling clutch according to the present invention.

In FIG. 13, there is shown a modified traveling clutch 30' according to the present invention. The traveling clutch 30' has the same construction as the aforementioned traveling clutch 30 except that the surface of the tapered male portion 39 has the plural straight grooves 38a formed circumferentially thereof. The grooves 38a are spaced at given intervals. It is to be understood that the clutch 30' provides the same advantage as the traveling clutch 30.

Figure 14:
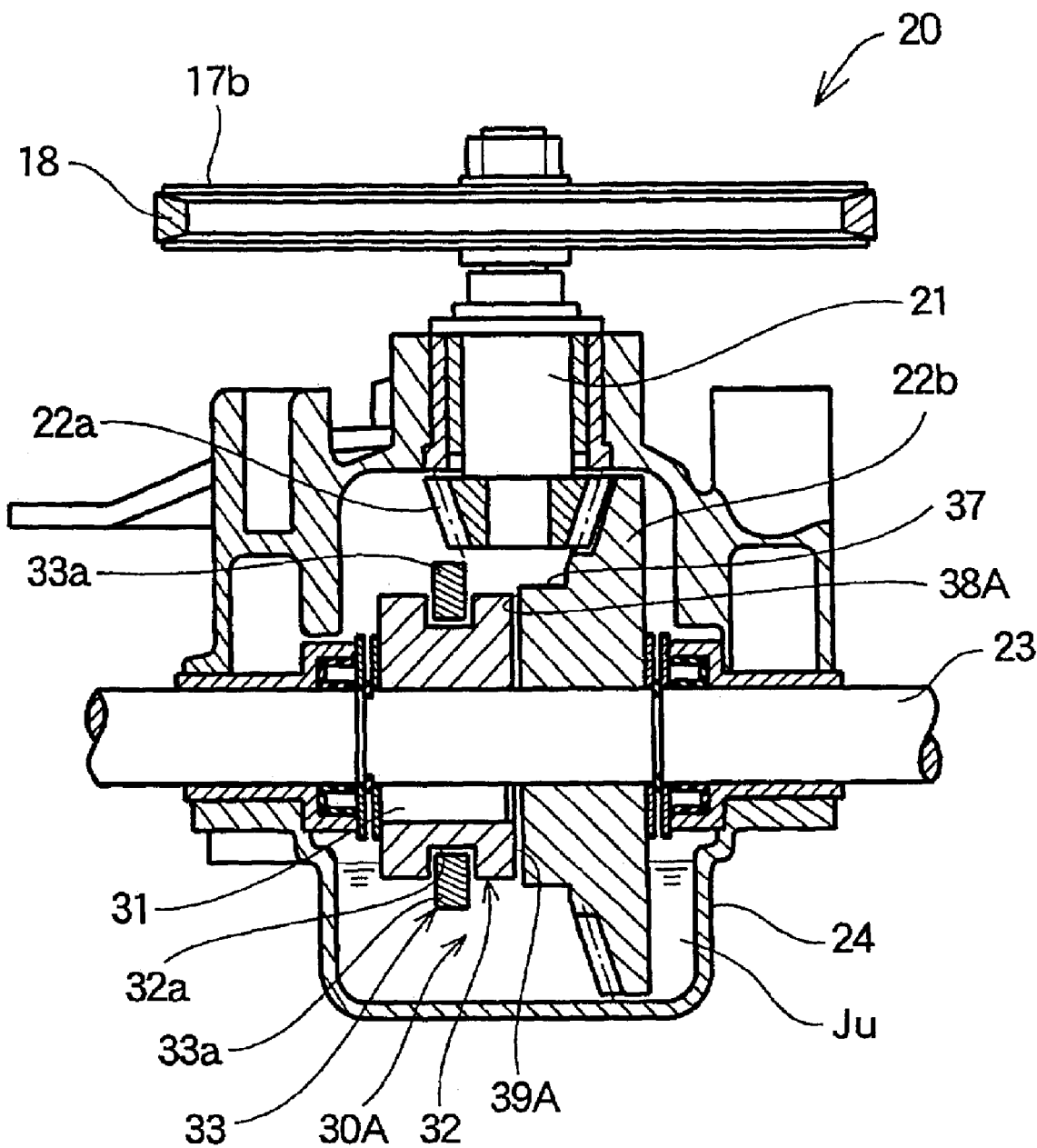
FIG. 14 is the view of FIG. 2 with the traveling clutch further modified according to the present invention.

FIG. 14 illustrates a further modified traveling clutch 30A according to the present invention. Elements of the traveling clutch 30A in common with the traveling clutch 30 discussed in relation to FIG. 1 through FIG. 12 are identically numbered and their descriptions are omitted.

The clutch 30A includes the case 24 containing the lubricating oil Ju, the bevel gear 22b (a driving member) having a flat surface 38A, and the clutch shifter 32 (a driven member) having a flat surface 39A. The bevel gear 22b and the clutch shifter 32 are disposed within the case 24 in such a manner as to be submerged in the oil Ju. When the clutch 30A is in the engaged state, the surface 38A and the surface 39A are in engagement with each other. The clutch 30A can be used when in the slipped state, similarly to the clutch 30. When the clutch 30A is in the disengaged state, the surfaces 38A, 39A are opposed to each other with a small gap formed therebetween. The clutch 30A is switched from the disengaged state to the slipped state, depending upon a surface pressure between the surfaces 38A, 39A. As is apparent from FIG. 14, the bevel gear 22b and the clutch shifter 32 of the clutch 30A are free from any tapered portion and have the flat surfaces 38A, 39A. It will be appreciated that the clutch 30A has the same advantage as the clutch 30.

Figure 15:
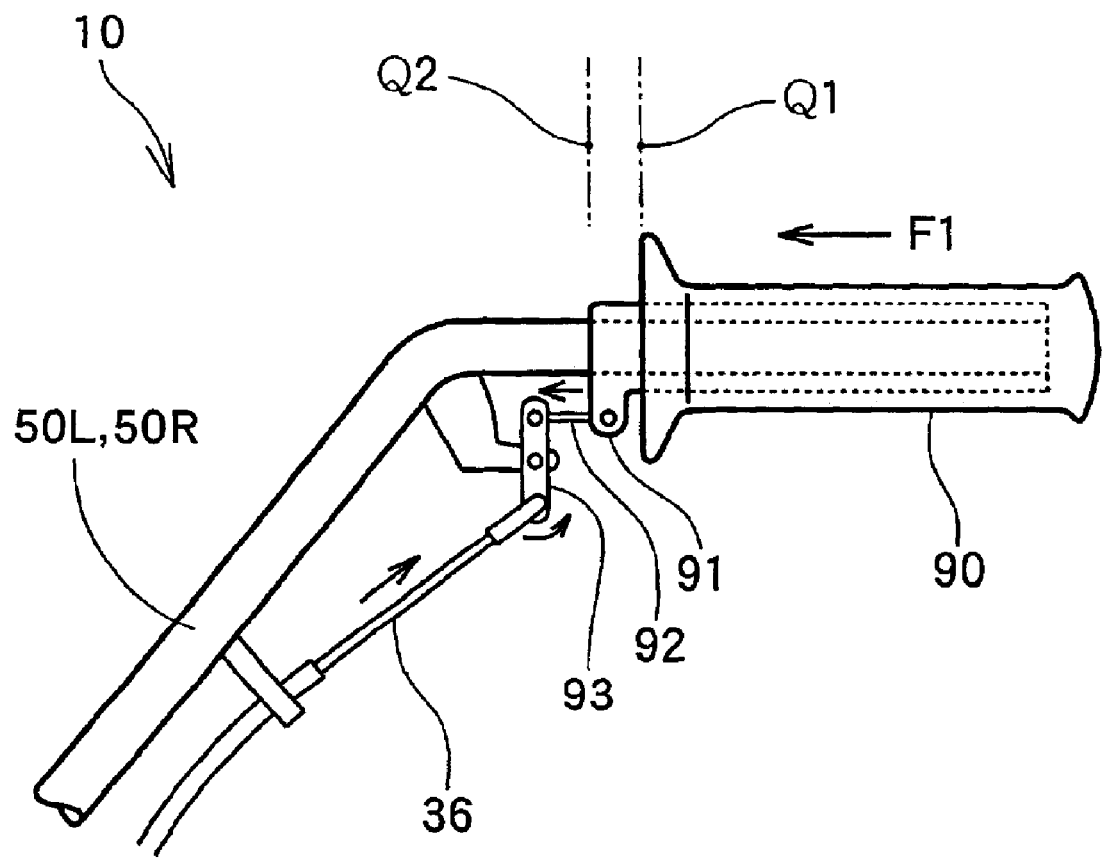
FIG. 15 is a view illustrating a modified grip clutch lever.

FIG. 15 shows a modified grip clutch lever 90 according to the present invention. The lever 90 is mounted on either of the handles 50L, 50R. The lever 90 is slidable forwardly and backwardly.

One of the handles 50L, 50R has a grip member (not shown) fixedly mounted thereon and the other has the lever 90 slidably mounted thereon.

The lever 90 serves both as a grip the operator grips for manipulation of the body 11 and as a clutch lever for operating the clutch 30.

When the grip clutch lever 90 is in the neutral position Q1, the clutch 30 is in the disengaged state to thereby stop the working machine 10.

A slider 91 is arranged to slide over the handle to the most advanced position Q2, along with the grip clutch lever 90, in correspondence to a pushing force F1 that pushes the lever 90 forwardly. The slider 91 is connected via a link 92 to a swing arm 93. The sliding movement of the slider 91 moves the link 92 forwardly, as shown by an arrow. This forward movement of the link 92 causes the swing arm 93 to rotate counterclockwise, as indicated by an arrow. The wire cable 36 is then pulled to operate the clutch 30.

Movement of the grip clutch lever 90 to the most advanced position Q2 brings the clutch 30 to the slipped state. In all other respects, the lever 90 is identical to the lever 70.

The operator can adjust his/her exertion of the pushing force on the grip clutch lever 90 in the most advanced position Q2. A pulling force that pulls the wire cable 36 is varied in correspondence to the pushing force exerted on the lever 90. The surface pressure between the surfaces of the tapered female and male portions 38, 39 is changed in correspondence to change in the pulling force.

The surface pressure is determined such that the bent point Cp corresponds to the switch point when the working machine is switched from the low load running state to the high load running state, or vice versa, as discussed above.

More specifically, the operator determines the pushing force exerted on the lever 90 in the most advanced position Q2, such that the bent point Cp corresponds to the switch point when the working machine 10 is switched between the low load running state and the high load running state.

The transmission ability of the clutch 30 is improved in correspondence to the forward pushing force F1 exerted on the lever 90. In other words, the clutch 30 transmits to the rear wheels 13, 13 the driving force corresponding to the pushing force F1. The working machine 10 is thus propelled by both the pushing force F1 of small magnitude the operator exerts on the lever 90 and the large driving force the clutch 30 transmits to the rear wheels 13, 13. This means that the working machine 10 is propelled with the aid of the driving force.

The thus arranged working machine 10 is easy to handle because the operator is required only to push the grip clutch lever 90 by hand, as is conventional, in propelling the working machine 10.

Figure 16:
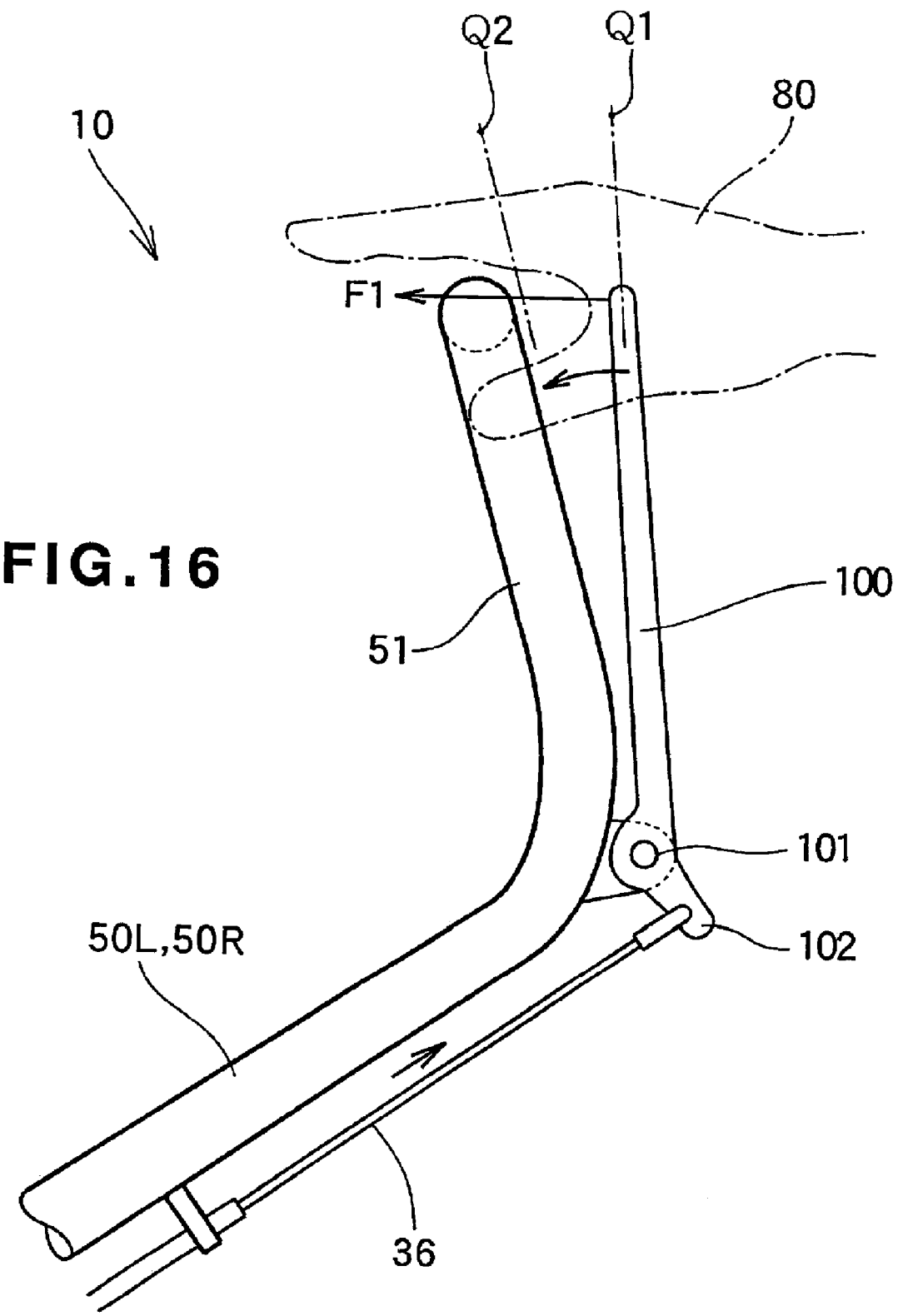
FIG. 16 is a view illustrating a further modified grip clutch lever.

FIG. 16 illustrates a further modified grip clutch lever 100 according to the present invention. A grip portion 51 extends between rear ends of the handles 50L, 50R. Behind the grip portion 51, the grip clutch lever 100 is positioned in alignment. The grip clutch lever 100 is mounted through a support shaft 101 to the rear ends of the handles 50L, 50R. The lever 100 is pivotable forwardly and backwardly on the support shaft 101. The lever 100 has an arm 102 connected to the end of the wire cable 36. In other respects, the lever 100 is identical to that discussed in relation to FIG. 1 to FIG. 12.

The grip clutch lever 100 serves to operate the clutch 30.

When the grip clutch lever 100 is in the neutral position Q1, the clutch 30 is in the disengaged state to thereby stop the working machine 10.

The lever 100 is caused to pivot forwardly to the fully pivoted position Q2, as shown by an arrow, by the forward pushing force F1 the operator's hand 80 exerts thereon. This forward pivotal movement of the lever 100 causes the arm 102 to pivot counterclockwise. The wire cable 36 is then pulled to operate the clutch 30, as discussed hereinbefore.

Moving the grip clutch lever 100 to the fully pivoted position Q2 brings the clutch 30 to the slipped state.

The operator can adjust his/her exertion of the pushing force on the grip clutch lever 100 in the fully pivoted position Q2. The pulling force that pulls the wire cable 36 is varied in correspondence to the pushing force exerted on the lever 100. The surface pressure between the surfaces of the tapered female and male portions 38, 39 is changed in correspondence to change in the pulling force.

The surface pressure is determined such that the bent point Cp corresponds to the switch point when the load at which the working machine 10 travels is switched from the low load to the high load, or vice versa, as stated above.

More specifically, the operator determines the pushing force exerted on the lever 100 in the fully pivoted position Q2, such that the bent point Cp corresponds to the switch point when the working machine 10 is switched from the low load running state to the high load running state or vice versa.

The transmission ability of the clutch 30 is improved in correspondence to the forward pushing force F1 exerted on the lever 100. In other words, the clutch 30 transmits to the rear wheels 13, 13 the driving force corresponding to the pushing force F1. The working machine 10 is propelled by both the pushing force F1 of small magnitude the operator exerts on the lever 100 and the large driving force the clutch 30 transmits to the rear wheels 13, 13. The working machine 10 is propelled with the aid of the driving force.

The thus arranged working machine 10 is easy to handle because the operator is required only to push the grip clutch lever 100 by hand, as is conventional, in propelling the working machine 10.

Figure 17A:
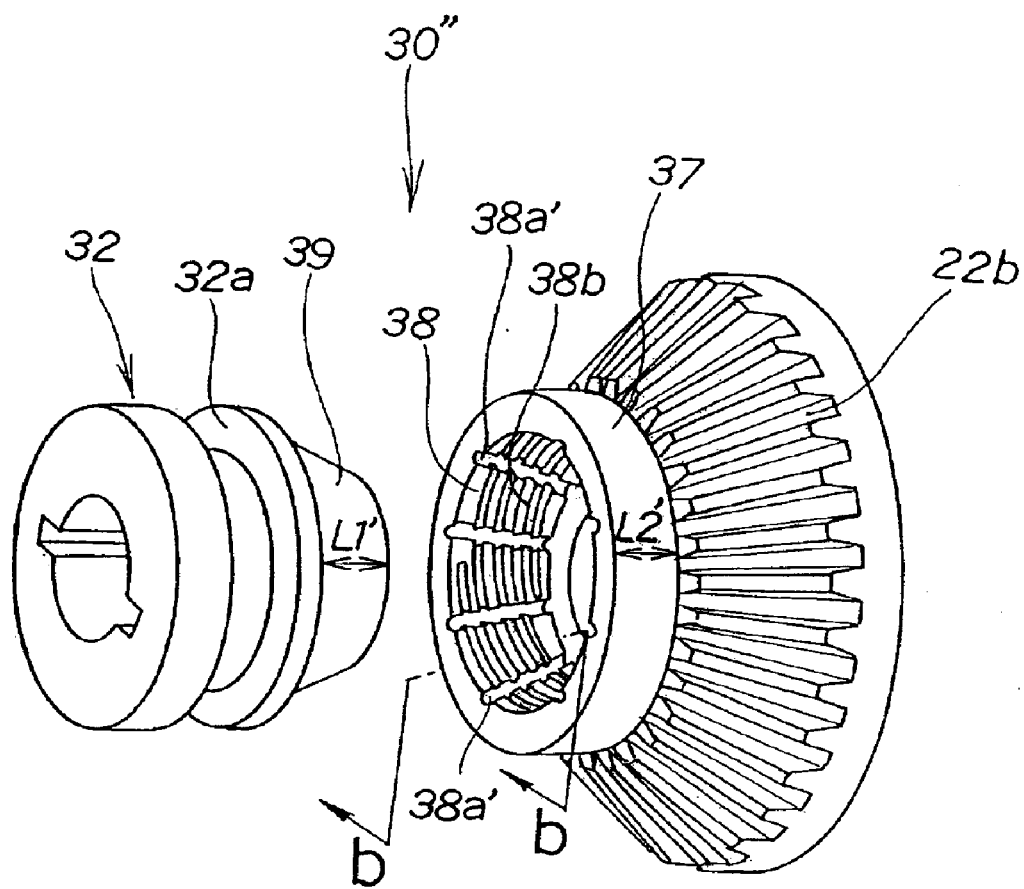
FIG. 17A is a view illustrating a still further modified traveling clutch according to the present invention and FIG. 17B is a cross-sectional view taken along line b—b of FIG. 17A.
Figure 17B:
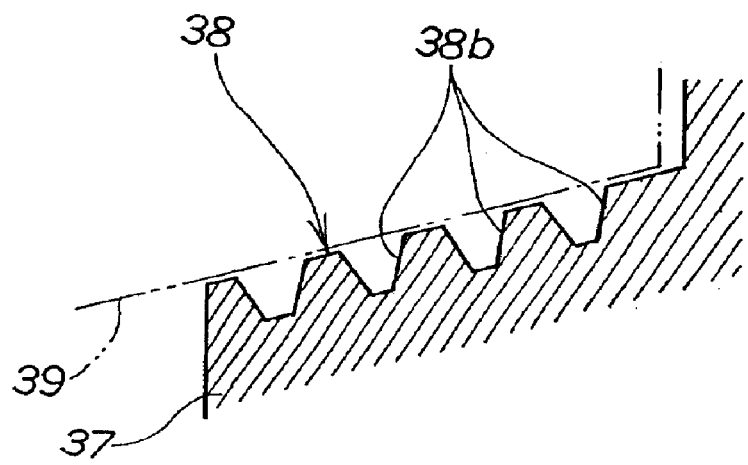

Referring to FIG. 17A and FIG. 17B, there is shown a modified traveling clutch 30". Elements of the traveling clutch 30" in common with those of the forgoing traveling clutches 30, 30' are identically numbered.

The tapered female portion 38 includes its surface having a helical groove 38b formed thereon. The surface of the female portion 38 has a plurality of straight grooves 38a' formed thereon. The straight grooves 38a' extend perpendicularly to the helical groove 38b. The straight grooves are positioned circumferentially of the surface of the female portion 38 at given intervals.

Figure 18B:
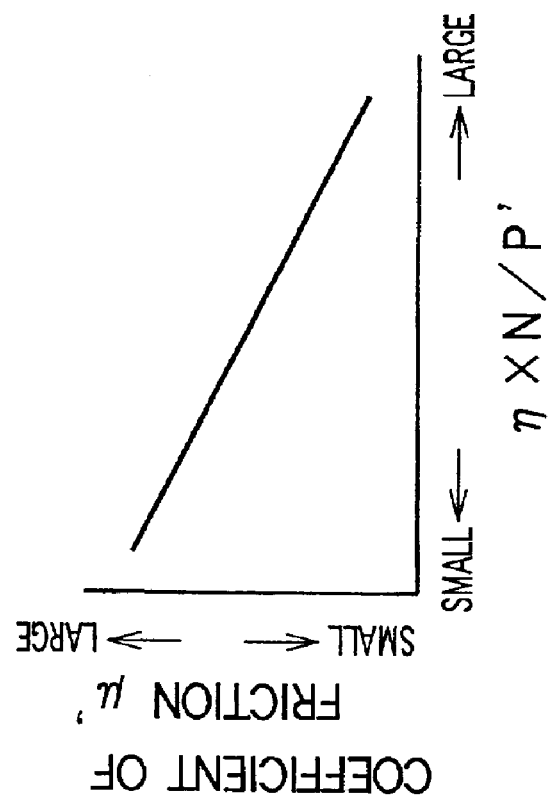
FIG. 18A is a schematic view illustrating how the traveling clutch of FIG. 17A
Figure 18A:
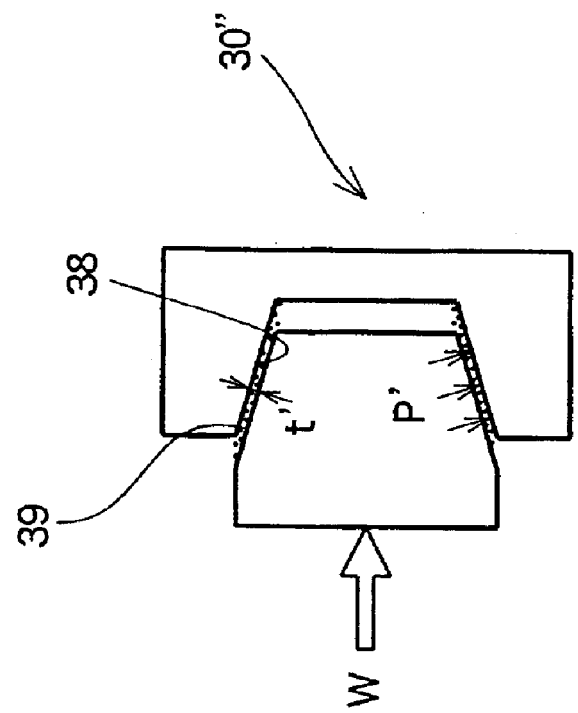

As shown in FIG. 18A, the clutch 30" includes the tapered female portion 38 and the tapered male portion 39. Whether the clutch 30 is switched from the disengaged state to the slipped state depends on the surface pressure between the surfaces of the female and male portions 38, 39. A film made of the lubricating oil Ju is interposed between the surfaces of the female and male portions 38, 39. A surface pressure P' exerted on the surface of the female portion 38 by the male portion 39 is changed in correspondence to a pressing force W' by which the surface of the male portion 39 is pressed against the surface of the female portion 38. The change in the surface pressure P' varies a thickness t' of the film. A relation between the surface pressure P' and the thickness t' is shown in the following table 2.

TABLE 2

| SURFACE PRESSURE | THICKNESS OF LUBRICATING OIL FILM | COEFFICIENT OF FRICTION | $\eta \times N$ | $(\eta \times N)/P'$ |
|---|---|---|---|---|
| SMALL | LARGE | SMALL | CONST. | LARGE |
| MIDDLE | MIDDLE | MIDDLE | | MIDDLE |
| LARGE | SMALL | LARGE | | SMALL |

As is apparent from the above table 2, when the surface pressure P' is small, the thickness t' of the film becomes large. The large thickness t' provides decreased coefficient of friction $\mu'$ between the surfaces of the female and male portions 38, 39. When the surface pressure P' is middle, the thickness t' is middle. The middle thickness t' provides the coefficient of friction $\mu'$ with middle amount. When the surface pressure P' is large, the thickness t' is rendered small. The small thickness t' provides increased coefficient of friction $\mu'$.

A characteristic of the clutch 30" can be evaluated using a parameter represented by a reference character $(\eta \times N)/P'$, where P' (Pa) is the surface pressure, $\eta$(Pa.s) is a viscosity of the lubricating oil Ju, and N (1/s) is a difference in the number of rotations per second between the male portion 39 and the female portion 38. N is, namely, the number of times the male portion 39 rotates relative to the female portion 38 per second when the clutch 30" is in the slipped clutch. The parameter $(\eta \times N)/P'$ is dimensionless.

With $\eta \times N$ kept constant, when the surface pressure P' is small, the parameter $(\eta \times N)/P'$ is large. When the surface pressure P' is middle, the parameter $(\eta \times N)/P'$ is of middle amount. When the surface pressure P' is large, the parameter $(\eta \times N)/P'$ is small.

When the parameter $(\eta \times N)/P'$ is large, the coefficient of friction $\mu'$ is small. When the parameter $(\eta \times N)/P'$ is middle, the coefficient of friction $\mu'$ is of middle amount. When the parameter $(\eta \times N)/P'$ is small, the coefficient of friction $\mu'$ is large.

FIG. 18B graphically shows the relation between the coefficient of friction $\mu'$ and the parameter $(\eta \times N)/P'$ as indicated in the table 2. As is apparent from FIG. 18B, the clutch 30" provides a characteristic curve shown in a coordinate system including a horizontal axis showing the parameter $(\eta \times N)/P'$ and a vertical axis showing the coefficient of friction $\mu'$. The characteristic curve of the clutch 30" is in the form of a straight line of negative slope, and is also called the foregoing "Stribeck curve".

The stribeck curve of FIG. 18B provides three states: (1) Boundary lubrication state where the surface pressure P' is large to thereby lessen the parameter $(\eta \times N)/P'$ and thin the film of the lubricating oil interposed between the surfaces of the female and male portions 38, 39, so that the coefficient of friction $\mu'$ is large; (2) Mixed lubrication state where as the surface pressure P' is reduced, the parameter $(\eta \times N)/P'$ is increased and the film of the lubricating oil is thickened, so that the coefficient of friction $\mu'$ is decreased; and (3) Hydrodynamic lubrication state where as the surface pressure P' is further reduced, the parameter $(\eta \times N)/P'$ is further increased and the film of the lubricating oil becomes sufficiently thick, so that the coefficient of friction $\mu'$ is made small.

The mixed lubrication state is a mixture of the boundary lubrication state and the hydrodynamic lubrication state. In the hydrodynamic lubrication state, the surface of the male portion 39 is completely kept off from the surface of the female portion 38 to ensure that the film of the lubricating oil is interposed therebetween.

As discussed above, the film of the lubricating oil is interposed between the female portion 38 and the male portion 39. The thickness t' of the film varies in correspondence to the surface pressure P'. As a result, the female and male portions 38, 39 provide: (1) Boundary lubrication state where the surface pressure P' is large; (2) Mixed lubrication state where the surface pressure P' is middle; and (3) Hydrodynamic lubrication state where the surface pressure P' is small.

When the traveling clutch 30" is used for a long time, the surfaces of the female and male portions 38, 39 can be worn into contact with each other at the increased areas thereof. That is, the use of the clutch 30" for the long time can increase the contact areas of the female and male portions 38, 39. The increased contact areas provides the reduced surface pressure P' even if the male portion 38 at a time when the clutch 30" is used for a long period of time undergoes the same pressing force W as that at a time when the clutch 30" began to be used. When the surface pressure P' is reduced, the thickness t' can be rendered large to thereby reduce the coefficient of friction $\mu'$ between the surfaces of the female and male portions 38, 39. The coefficient of friction $\mu'$ can be abruptly changed when the female and male portions 38, 39 are brought from the boundary lubrication state to the mixed or hydrodynamic lubrication states.

According to the present invention, however, the thickness t' of the lubricating oil Ju remains small. In other words, the female and male portions 38, 39 are held in the boundary lubrication state regardless of the surface pressure P'. Because the female and male portions 38, 39 are in the boundary lubrication state, the coefficient of friction $\mu'$ is kept large. The friction force produced between the female and male portions 38, 39 when the clutch 30" began to be used can be maintained over a long period of time. The clutch 30" can thus be operated steadily.

Discussion will be made as to how the plural straight grooves 38a' and the helical groove 38b provide advantages.

Figure 19A:
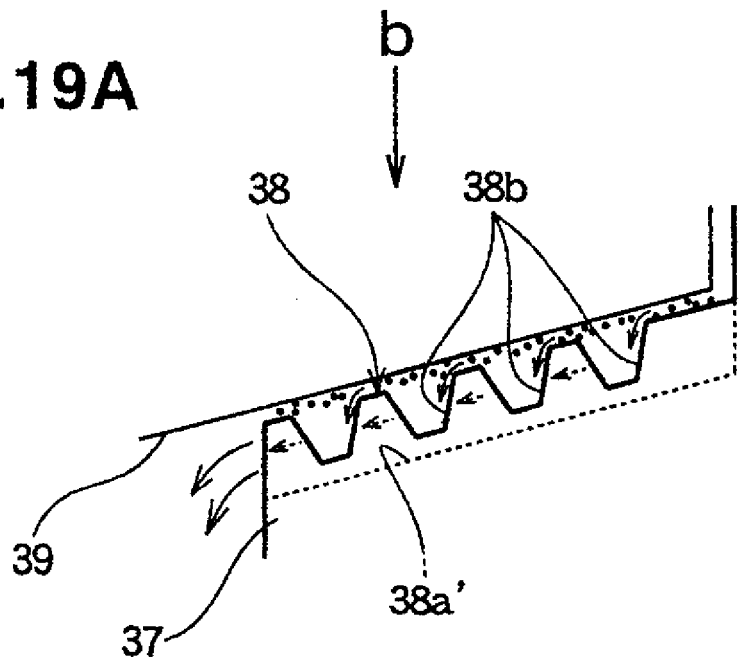
FIG. 19A is a cross-sectional view of the female and male portions of the traveling clutch and FIG. 19B shows, on an enlarged scale, part of the female portion as viewed in a direction of an arrow designated b.
Figure 19B:
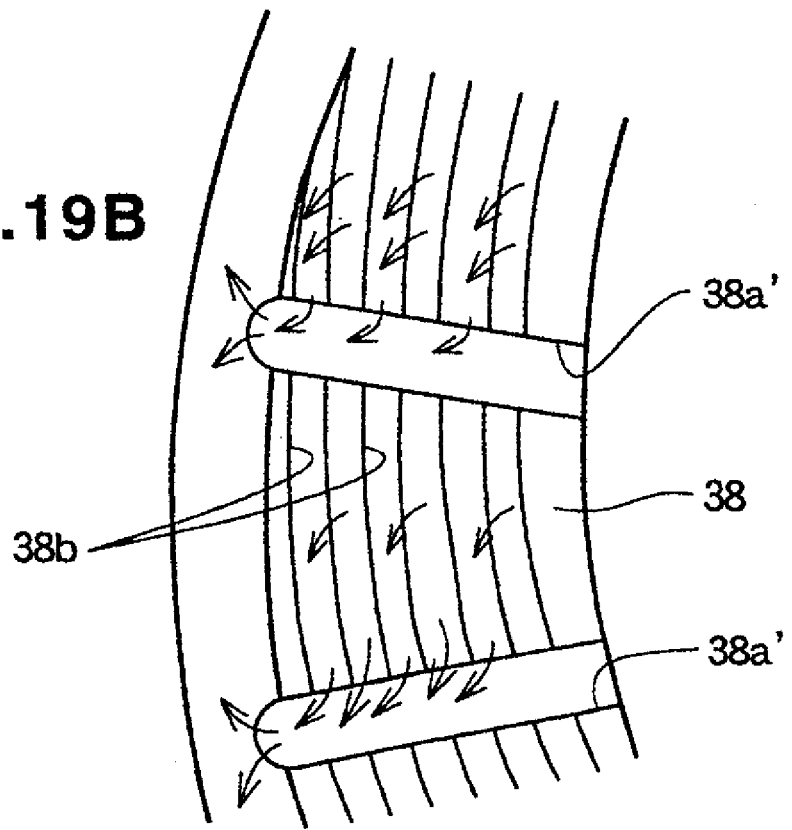

Referring to FIG. 19A and FIG. 19B, the film of the lubricating oil is interposed between the surfaces of the female and male portions 38, 39. The number of rotations of the male portion 39 is different from that of female portion 38. Using such a difference in the number of rotations, the lubricating oil between the surfaces of the female and male portions 38, 39 can be discharged through the helical groove 38b and the straight grooves 38a' out of the clutch 30". By thus discharging the oil, it becomes possible to reduce the thickness t' of the film.

More specifically, the oil interposed between the surfaces of the female and male portions 38, 39 flows into the helical groove 38b and the straight grooves 38a', as indicated by arrows of FIG. 19A and FIG. 19B. The oil in the helical groove 38b flows into the straight grooves 38a'. When the clutch 30" is in the slipped state where the male portion 39 slips on the female portion 38, the surfaces of the female and male portions 38, 39 wear each other to thereby produce a powder therebetween. Such a powder or the oil held between the surfaces of the female and male portions 38, 39 are scraped off by edges forming the straight grooves 38a'.

Part of the powder falls into the straight grooves 38a'. Even such part of powder and the oil within the straight grooves 38a' are discharged out under the action of a centrifugal force produced by the rotation of the female portion 38. This makes it possible to reduce the thickness t' of the film between the surfaces of the female and male portions 38, 39.

Using the difference in the number of rotations between the female and male portions 38, 39, the lubricating oil Ju in the case 24 is rapidly supplied through the helical groove 38b to a space formed between the surfaces of the female and male portions 38, 39. The thus supplied lubricating oil is formed into a film. With this arrangement, it is ensured that the male portion 39 slips on the female portion 38. Additionally, the surfaces of the female and male portions 38, 39 can be cooled by the supplied lubricating oil.

The clutch 30" is advantageous because the forming the straight grooves 38a' and the helical groove 38b on the surface of the female portion 38 requires a less cost than reducing the surface roughness of the surfaces of the female and male portions 38, 39 or making the surfaces of the female and male portions 38, 39 with precision.

Turning to FIG. 20, there is shown a coordinate system having a vertical axis showing the coefficient of friction $\mu'$ and a horizontal axis showing the parameter $(\eta \times N)/P$, where $\eta$ stands for the viscosity (Pa.s) of the lubricating oil, N is the number of rotations (1/s) the male portion 39 rotates relative to the female portion 39 per second, P' is the surface pressure (Pa) between the surfaces of the female and male portions 38, 39, and $\mu'$ is the coefficient of friction between the surfaces of the female and male portions 38, 39.

Similarly to FIG. 8, there are shown stribeck curves of the clutch 30" and a different type of traveling clutch. These stribeck curves are based on data obtained from experiments in which the coefficients of friction were measured at the various parameters. The clutches on which the experiments were carried out are under the following condition:

- average diameters of the tapered female and male portions 38, 39; 40 (mm)
- lengths L1', L2' (see FIG. 17A) of the tapered female and male portions 38, 39; 7 (mm)
- angles the surfaces of the female and male portions 38, 39 are inclined: 12 (deg.)
- surface roughness of the surfaces of the female and male portions 38, 39: 0.1 to 1.0 ($\mu$m)
- material for the female portion 38: casting of aluminum bronze
- material for the male portion 39: sintered iron-based metal
- lubricating oil: engine oil
- viscosity of the lubricating oil $\eta$: 0.055 (Pa.s)
- the difference N in the number of rotations per second between the male portion 39 and the female portion 38: 1.7 to 5.0 (1/s)
- the surface pressure P between the surfaces of the female and male portions 38, 39: $5 \times 10^6$ to $70 \times 10^6$ (Pa).

In FIG. 20, the different type of traveling clutch includes the female portion 38 having only the plural straight grooves 38a' formed on the surface thereof. The clutch 30'' includes the female portion 38 having the helical groove 38b and the plural straight grooves 38a' formed on the surface thereof. The straight grooves 38a' extend perpendicular to the helical groove 38b.

Solid stars and a solid line show the stribeck curve of the different type of traveling clutch when the clutch began to be used. Such a different traveling clutch is identical to the clutch 30'' except that the helical groove 38b is not formed on the surface of the female portion 38. Open stars and a broken line show the stribeck curve of the clutch free from the helical groove when the clutch is used to such an extent that the surfaces of the female and male portions 38, 39 are arranged to contact each other at the substantially entire areas thereof. Solid circles and a solid line show the stribeck curve of the clutch 30'' when the clutch 30'' began to be used. Open circles and a broken line show the stribeck curve of the clutch 30'' when the clutch 30'' is used to such an extent that the surfaces of the female and male portions 38, 39 are arranged to contact each other at the substantially entire areas thereof.

For the clutch free from the helical groove which began to be used, as indicated by the solid stars and the solid line, the coefficient of friction $\mu'$ is kept constant over a wide range of the parameter ($\eta \times N$)/P'. At this time, the surfaces of the female and male portions 38, 39 contact each other at one tenth the entire areas thereof.

The contact areas of the surfaces of the female and male portions 38, 39 are small when the clutch starts to be used, and hence the surface pressure is large. This results in the decreased parameter ($\eta \times N$)/P' and the thinned film of the lubricating oil between the female and male portions 38, 39. The female and male portions 38, 39 of the clutch 30 thus provides the boundary lubrication state where the coefficient of friction $\mu'$ is large.

When the clutch free from the helical groove is used to such an extent that the surfaces of the female and male portions 38, 39 wear away into contact with each other throughout the areas thereof, as indicated by the open stars and the broken line, the coefficient of friction $\mu'$ is much smaller than when the clutch began to be used. At this time, the surfaces of the female and male portions 38, 39 contact each other at the substantially entire areas thereof.

Since the contact areas of the surfaces of the female and male portions 38, 39 are large, the surface pressure is small. This results in the thickened film of the lubricating oil between the female and male portions 38, 39. The thickened film of the lubricating oil provides the reduced coefficient of friction $\mu'$. The female and male portions 38, 39 of the clutch 30 are brought from the boundary lubrication state to the mixed lubrication state.

For the clutch 30'' which began to be used, as shown by the solid circles and the solid line, the coefficient of friction $\mu'$ is kept constant over the wide range of the parameter ($\eta \times N$)/P'. At this time, the surfaces of the female and male portions 38, 39 contact each other at one tenth the entire areas thereof.

The contact areas of the surfaces of the female and male portions 38, 39 are small when the clutch 30'' starts to be used, and hence the surface pressure is large. This results in the decreased parameter ($\eta \times N$)/P' and the thinned film of the lubricating oil between the female and male portions 38, 39. The female and male portions 38, 39 of the clutch 30 thus provides the boundary lubrication state where the coefficient of friction $\mu'$ is large.

For the clutch 30'' which is used to such an extent that the surfaces of the female and male portions 38, 39 wear away into contact with each other throughout the areas thereof, as indicated by the open circles and the broken line, the coefficient of friction $\mu'$ is kept high. At this time, the surfaces of the female and male portions 38, 39 contact each other at the substantially entire areas thereof.

The thickness of the lubricating oil is kept small although the surfaces of the female and male portions 38, 39 are arranged to contact each other at the substantially entire areas thereof. The female and male portions 38, 39 thus maintain the boundary lubrication state regardless of the surface pressure. Therefore, even when the contact areas of the surfaces of the female and male portions 38, 39 are changed to thereby reduce the surface pressure, the coefficient of friction $\mu'$ remains large.

Figure 21:
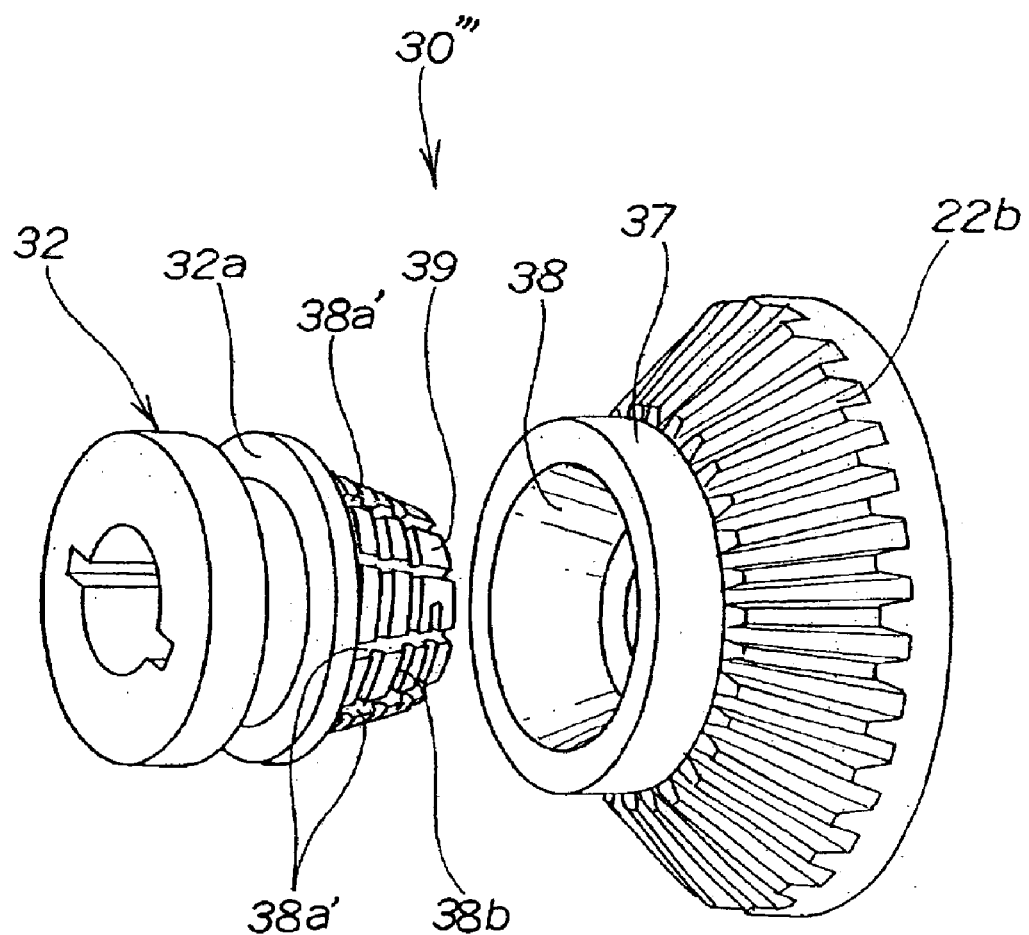
FIG. 21 is a view illustrating a still further modified traveling clutch according to the present invention.

With respect to FIG. 21, there is shown a further modified traveling clutch 30''' according to the present invention. The clutch 30''' is the same as the clutch 30'' except that the helical grooves 38b and the plural straight grooves 38a' are formed on the surface of the male portion 39 rather than the female portion 38. It will be understood that the clutch 30''' provides the same advantage as the clutch 30''.

Figure 22A:
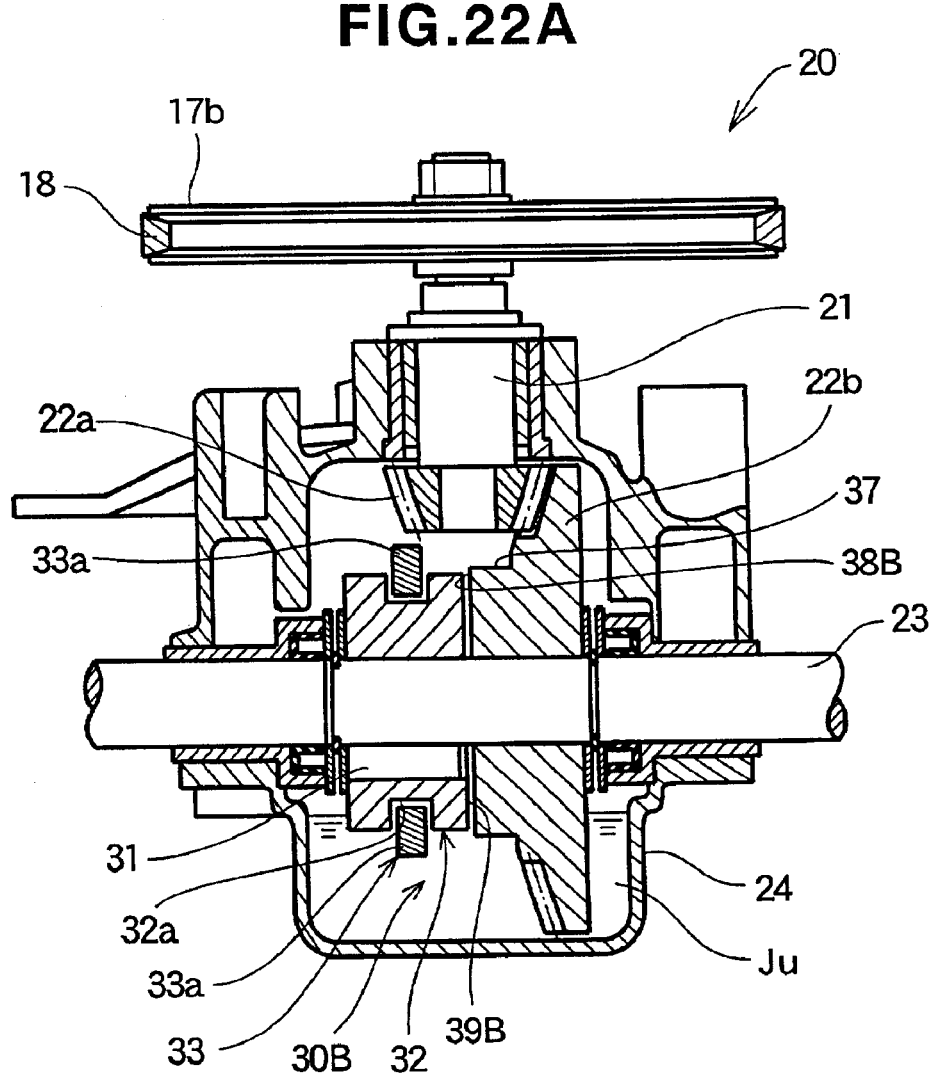
FIG. 22A is a view illustrating a still further modified traveling clutch according to the present invention and FIG. 22B is a front elevation view of a female portion of the traveling clutch of FIG. 22A.
Figure 22B:
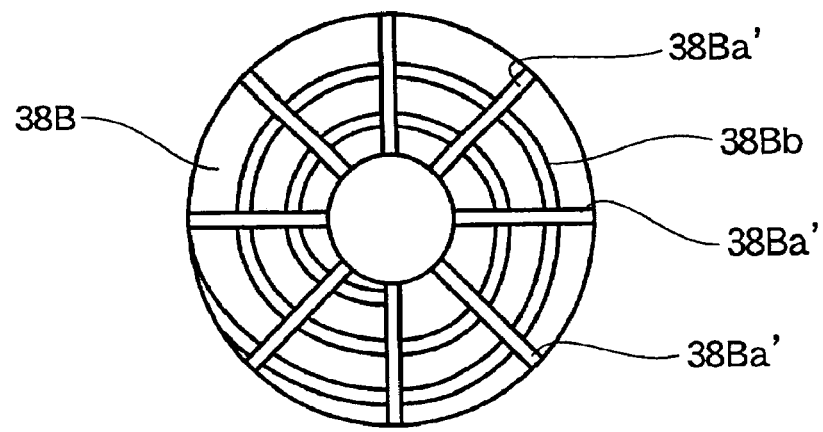
Figure 23:
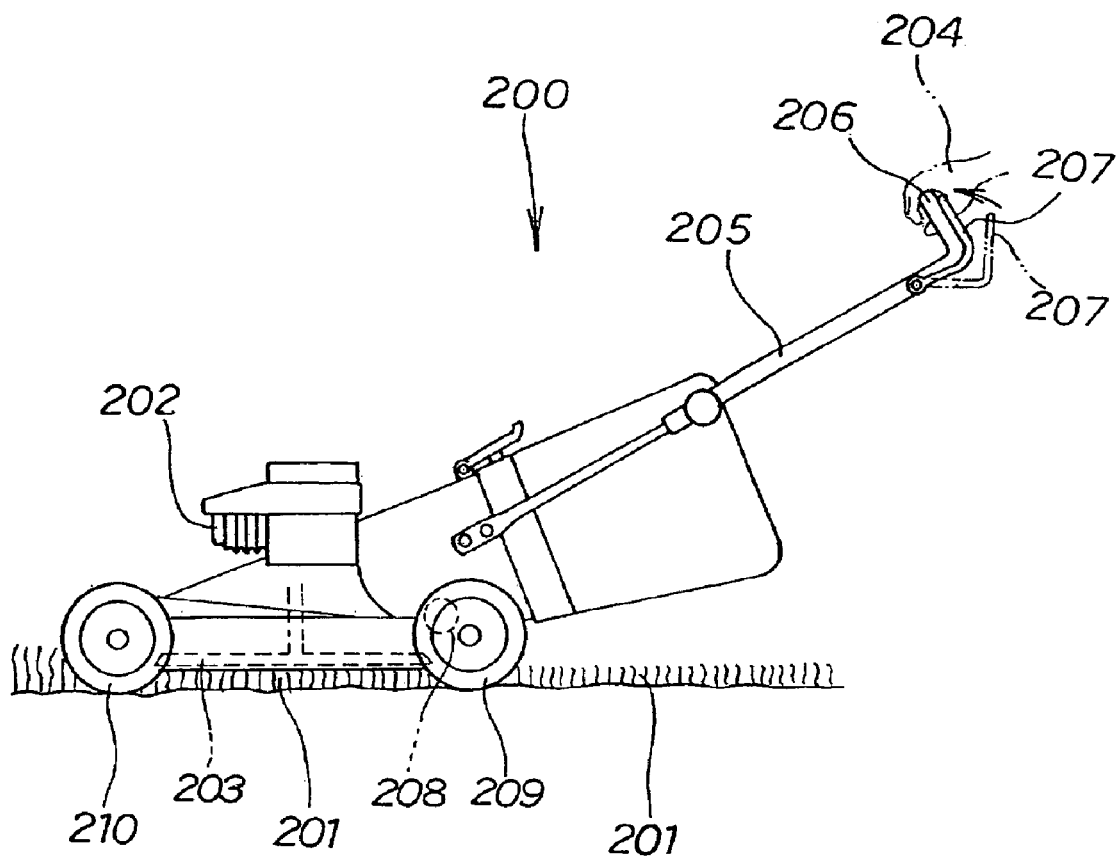
FIG. 23 is a view illustrating a conventional walk-behind working machine.

FIG. 22A and FIG. 22B illustrate a further modified traveling clutch 30B according to the present invention. Elements of the traveling clutch 30B in common with the traveling clutch 30 discussed in relation to FIG. 1 through FIG. 12 are identically numbered and their descriptions are omitted.

The clutch 30B includes the case 24 containing the lubricating oil Ju, the bevel gear 22b (a driving member) having a flat surface 38B, and the clutch shifter 32 (a driven member) having a flat surface 39B. The bevel gear 22b and the clutch shifter 32 are disposed within the case 24 in such a manner as to be submerged in the oil Ju. When the clutch 30B is in the engaged state, the surface 38B and the surface 39B are in engagement with each other. The clutch 30B can be used when in the slipped state, similarly to the clutch 30. When the clutch 30B is in the disengaged state, the surfaces 38B, 39B are opposed to each other with a small gap formed therebetween. The clutch 30B is switched from the disengaged state to the slipped state, depending upon a surface pressure between the surfaces 38B, 39B. As is apparent from FIG. 22A, the bevel gear 22b and the clutch shifter 32 of the clutch 30B are free from any tapered portion and have the flat surfaces 38B, 39B, respectively. It will be appreciated that the clutch 30B has the same advantage as the clutch 30.

As shown in FIG. 22B, the surface 38B has formed thereon a spiral groove 38Bb and plural straight grooves 38Ba' extending perpendicular to the grooves 38Bb. Each straight groove 38Ba' extends radially from the center of the surface 38B. The straight grooves 38Ba' are spaced at given angles.

In the illustrated embodiments, the working machine 10 has been described as being applied to the lawn mower. However, the working machine 10 may be, for example, a walk-behind grass mower, a walk-behind snow remover, a walk-behind one-, two-, three-, or four-wheeled transport vehicle having a drive source.

The term "drive source" as used herein includes an electric motor as well as the engine 14.

Either the female portion 38 or the male portion 39 may be arranged to serve as a driving member, so that the drive power is transmitted from the drive source to the rear wheels.

The helical grooves 38b, 38Bb and the straight grooves 38a', 38Ba' may be sized to serve the aforementioned function. The straight grooves 38a', 38Ba' maybe spaced at different angles to serve the aforementioned function.

The present disclosure relates to the subject matters of Japanese Patent Application Nos. 2001-154530 and 2001-155289, filed May 23, 2001 and May 24, 2001, respectively, the disclosures of which are expressly incorporated herein by reference in their entireties.

What is claimed is:

1. A walk-behind working machine comprising:
    a drive source;
    a plurality of wheels rotationally driven by the drive source;
    a traveling clutch disposed between the drive source and the wheels for transmitting driving power from the drive source to the wheels to cause the walk-behind working machine to travel along a surface, the traveling clutch having a case containing a lubricating oil;
    a driving member submerged in the lubricating oil contained in the case of the traveling clutch and having a friction surface;
    a driven member having a friction surface and being submerged in the lubricating oil contained in the case of the traveling clutch for undergoing rotation relative to the driving member while a film of the lubricating oil is always disposed between the friction surfaces of the driven and driving members, the friction surface of the driven member being positioned to be brought into surface contact with the friction surface of the driving member at a preselected surface pressure to place the traveling clutch in a slipping state during which the driven member slips on the driving member; and
    a clutch lever manually operable to switch the traveling clutch from a disengaged state in which the traveling clutch does not transmit drive power from the drive source to the wheels, through the slipping state, to an engaged state in which the traveling clutch transmits drive power from the drive source to the wheels, the clutch lever being connected to the traveling clutch so that the surface pressure between the respective friction surfaces of the driving and driven members varies in direct proportion to a pushing force applied on the clutch lever and so that the pushing force remains substantially constant regardless of an increase in a running resistance to the walk-behind working machine while traveling along the surface;
    wherein a characteristic curve of the traveling clutch plotted in a coordinate system including a vertical axis representing a coefficient of friction between the friction surfaces of the driving and driven members and a horizontal axis representing a parameter $(\eta \times N)/P$, which is obtained by dividing by the preselected surface pressure P a product of a viscosity $\eta$ of the lubricating oil contained in the case and the number of times N the driven member rotates relative to the driving member per second, has a first downward-sloping curved portion having a first slope and a second downward-sloping curved portion having a second slope smaller than the first solve and being connected to the first downward-sloping curve portion via a bent point, the preselected surface pressure being determined so that the bent point corresponds to a switch point when the walk-behind working machine is switched from a first state in which the walk-behind working machine operates at a high load to a second state in which the walk-behind working machine operates at a low load, the first downward-sloping curve portion representing the relationship between the coefficient of friction $\eta$ and the surface pressure P between the respective friction surfaces of the driving and driven members when the parameter $(\eta \times N)/P$ is smaller than a parameter value of $5 \times 10^{-8}$ at the bent point, and the second downwardly-sloping curve portion representing the relationship between the coefficient of friction $\eta$ and the surface pressure P between the respective friction surfaces of the driving and driven members when the parameter $(\eta \times N)/P$ is greater than the parameter value at the bent point.

2. A walk-behind working machine as claimed in claim 1; wherein at least one of the friction surface of the driving member and the friction surface of the driven member has a helical groove and a plurality of straight grooves formed thereon, the straight grooves extending generally perpendicular to the helical groove.

3. A walk-behind working machine as claimed in claim 1; wherein the friction surface of each of the driving member and the driven member is a generally conical-shaped surface.

4. A walk-behind working machine as claimed in claim 1; wherein the friction surface of each of the driving member and the driven member is a generally planar surface.

5. A walk-behind working machine as claimed in claim 1; further comprising a wire cable having a first end portion connected to the clutch lever and a second end portion connected to the traveling clutch so that the traveling clutch is switched from the disengaged state, through the slipping state, to the engaged state by a pulling force applied on the wire cable as a result of the pushing force applied on the clutch lever.

6. A walk-behind working machine as claimed in claim 5; wherein the preselected pressure between the friction surfaces of the driving and driven members is varied in accordance with a pulling force applied on the wire cable so that when a preselected low pulling force is applied on the cable, the traveling clutch is switched to the slipping state to thereby rotate the driving wheels and allow the walk-behind working machine to start moving at a low speed.

7. A walk-behind working machine as claimed in claim 6; wherein the clutch lever comprises a single grip/clutch lever serving also as a grip handle for gripping by an operator to maneuver the walk-behind working machine during movement thereof.

8. A walk-behind working machine according to claim 1; wherein the friction surface of one of the driving member and the driven member has a plurality of grooves formed thereon.

9. A walk-behind working machine according to claim 8; wherein the grooves are generally straight.

10. A walk-behind working machine according to claim 1; wherein the friction surface of at least one of the driving member and the driven member is generally smooth without any interruptions thereon.

11. A walk-behind working machine according to claim 1; wherein the friction surface of each of the driving member and the driven member is generally smooth without any interruptions thereon.

12. A walk-behind working machine as claimed in claim 1; wherein the first downward-sloping curve portion and the bent point define a first region of the coordinate system in which boundary lubrication occurs between the corresponding friction surfaces of the driving and driven members, the boundary lubrication being a lubrication state in which a the film of the lubricating oil exists between the friction surfaces while the friction surfaces are in surface-to-surface contact; and wherein the second downward-sloping curve portion and the bent point define a second region of the coordinate system in which hydrodynamic lubrication and mixed lubrication occurs between the corresponding friction surfaces of the driving and driven members, the hydrodynamic lubrication being a lubrication state in which the friction surfaces are completely separated by a the film of the lubricating oil, and the mixed lubrication being a lubrication state corresponding to a combination of a hydrodynamic pressure and a contact pressure between the friction surfaces.

13. A walk-behind working machine as claimed in claim 12; wherein in the first region of the coordinate system the walk-behind working machine is in the first state; and wherein in the second region of the coordinate system the walk-behind working machine is in the second state.

14. A walk-behind working machine as claimed in claim 12; wherein the mixed lubrication occurs in a part of the second region of the coordinate system which is adjacent to the first region of the coordinate system; and wherein the hydrodynamic lubrication occurs in a part of the second region of the coordinate system which is remote from the first region of the coordinate system.

15. A walk-behind working machine comprising: a drive source; a plurality of wheels rotationally driven by the drive source; a traveling clutch for transmitting driving power from the drive source to the wheels to cause the walk-behind working machine to travel along a surface, the traveling clutch having a case containing a lubricating oil; a driving member having a first friction surface and being disposed in the case of the traveling clutch; a driven member for undergoing rotation relative to the driving member and having a second friction surface positioned to be brought into surface contact with the first friction surface at a preselected surface pressure, the driven member being disposed in the case of the traveling clutch so that a film of the lubricating oil is always disposed between the first and second friction surfaces; and a clutch lever manually operable to switch the traveling clutch from a disengaged state in which the traveling clutch does not transmit drive power from the drive source to the wheels, through the slipping state, to an engaged state in which the traveling clutch transmits drive power from the drive source to the wheels, the clutch lever being connected to the traveling clutch so that the surface pressure between the respective first and second friction surfaces of the driving and driven members varies in direct proportion to a pushing force applied on the clutch lever and so that the pushing force remains substantially constant regardless of an increase in a running resistance to the walk-behind working machine while traveling along the surface; wherein a characteristic curve of the traveling clutch plotted in a coordinate system including a vertical axis representing a coefficient of friction between the first and second friction surfaces and a horizontal axis representing a parameter $(\eta \times N)/P$, which is obtained by dividing by the preselected surface pressure P a product of a viscosity $\eta$ of the lubricating oil and a number of times N the driven member rotates relative to the driving member per second, has a first downward-sloping curve portion having a first slope and a second downward-sloping curve portion having a second slope smaller than the first slope and being connected to the first downward-sloping curve portion via a bent point, the preselected surface pressure being determined so that the bent point corresponds to a switch point when the walk-behind working machine is switched from a first state in which the walk-behind working machine operates at a high load to a second state in which the walk-behind working machine operates at a low load, the first downward-sloping curve portion representing the relationship between the coefficient of friction $\eta$ and the surface pressure P between the respective friction surfaces of the driving and driven members when the parameter $(\eta \times N)/P$ is smaller than a parameter value of $5 \times 10^{-8}$ at the bent point, and the second downward-sloping curve portion representing the relationship between the coefficient of friction $\eta$ and the surface pressure P between the respective friction surfaces of the driving and driven members when the parameter $(\eta \times N)/P$ is greater than the parameter value at the bent point.

16. A walk-behind working machine as claimed in claim 15; wherein at least one of the first and second friction surfaces has a helical groove and a plurality of straight grooves formed thereon, the straight grooves extending generally perpendicular to the helical groove.

17. A walk-behind working machine as claimed in claim 15; wherein the each of the first and second friction surfaces comprises a generally conical-shaped surface.

18. A walk-behind working machine as claimed in claim 15; wherein each of the first and second friction surfaces comprises a generally planar surface.

19. A walk-behind working machine as claimed in claim 15; wherein the first downward-sloping curve portion and the bent point define a first region of the coordinate system in which boundary lubrication occurs between the corresponding first and second friction surfaces of the driving and driven members, the boundary lubrication being a lubrication state in which the film of the lubricating oil exists between the first and second friction surfaces while the first and second friction surfaces are in surface-to-surface contact; and wherein the second downward-sloping curve portion and the bent point define a second region of the coordinate system in which hydrodynamic lubrication and mixed lubrication occurs between the corresponding first and second friction surfaces of the driving and driven members, the hydrodynamic lubrication being a lubrication state in which the first and second friction surfaces are completely separated by the film of the lubricating oil, and the mixed lubrication being a lubrication state corresponding to a combination of a hydrodynamic pressure and a contact pressure between the first and second friction surfaces.

20. A walk-behind working machine as claimed in claim 15; wherein in the first region of the coordinate system the walk-behind working machine is in the first state; and wherein in the second region of the coordinate system the walk-behind working machine is in the second state.

21. A walk-behind working machine as claimed in claim 15; wherein the mixed lubrication occurs in a part of the second region of the coordinate system which is adjacent to the first region of the coordinate system; and wherein the hydrodynamic lubrication occurs in a part of the second region of the coordinate system which is remote from the first region of the coordinate system.

22. A walk-behind working machine comprising:

a drive source;

a plurality of wheels rotationally driven by the drive source;

a traveling clutch for transmitting driving power from the drive source to the wheels to cause the walk-behind working machine to travel along a surface, the traveling clutch having a case containing a lubricating oil;

a driving member having a first friction surface and being disposed in the case of the traveling clutch;

a driven member for undergoing rotation relative to the driving member and having a second friction surface positioned to be brought into surface contact with the first friction surface at a preselected surface pressure, the driven member beina disposed in the case of the traveling clutch so that a film of the lubricating oil is always disposed between the first and second friction surfaces; and a clutch lever manually operable to switch the traveling clutch from a disengaged state in which the traveling clutch does not transmit drive power from the drive source to the wheels, through the slipping state, to an engaged state in which the traveling clutch transmits drive power from the drive source to the wheels, the clutch lever being connected to the traveling clutch so that the surface pressure between the respective first and second friction surfaces of the driving and driven members varies in direct proportion to a pushing force applied on the clutch lever and so that the pushing force remains substantially constant regardless of an increase in a running resistance to the walk-behind working machine while traveling along the surface;

wherein a characteristic curve of the traveling clutch plotted in a coordinate system including a vertical axis representing a coefficient of friction between the first and second friction surfaces and a horizontal axis representing a parameter $(\eta \times N)/P$, which is obtained by dividing by the preselected surface pressure P a product of a viscosity $\eta$ of the lubricating oil and a number of times N the driven member rotates relative to the driving member per second, defines first, second and third lubrication states, the first lubrication state corresponding to a state in which a film of the lubricating oil exists between the first and second friction surfaces while the first and second friction surfaces are in surface-to-surface contact, the second lubrication state corresponding to a combination of a hydrodynamic pressure and a contact pressure between the first and second friction surfaces, and the third lubrication state corresponding to a state in which the first and second friction surfaces are completely separated by a film of the lubricating oil.

23. A walk-behind working machine as claimed in claim 22; wherein the preselected surface pressure between the corresponding first and second friction surfaces of the driving and driven members is determined so that the first lubrication state corresponds to a state in which the walk-behind working machine operates in a first state in which the walk-behind working machine operates at a high load and so that the second and third lubrication states correspond to a state in which the walk-behind working machine operates in a second state in which the walk-behind working machine operates at a low load.

24. A walk-behind working machine as claimed in claim 22; wherein at least one of the first and second friction surfaces has a helical groove and a plurality of straight grooves formed thereon, the straight grooves extending generally perpendicular to the helical groove.

25. A walk-behind working machine as claimed in claim 22; wherein each of the first and second friction surfaces comprises a generally conical-shaped surface.

26. A walk-behind working machine as claimed in claim 22; wherein each of the first and second friction surfaces comprises a generally planar surface.

27. A walk-behind working machine as claimed in claim 22; further comprising a wire cable having a first end portion connected to the clutch lever and a second end portion connected to the traveling clutch so that the traveling clutch is switched from the disengaged state, through the slipping state, to the engaged state by a pulling force applied on the wire cable as a result of a pushing force applied on the clutch lever.

28. A walk-behind working machine as claimed in claim 27; wherein the preselected surface pressure between the first and second friction surfaces is varied in accordance with a pulling force applied on the wire cable so that when a preselected low pulling force is applied on the cable, the traveling clutch is switched to the slipping state to thereby rotate the driving wheels and allow the walk-behind working machine to start moving at a low speed.

29. A walk-behind working machine as claimed in claim 28; wherein the clutch lever comprises a single grip/clutch lever serving also as a grip handle for gripping by an operator to maneuver the walk-behind working machine during movement thereof.

30. A walk-behind working machine according to claim 22; wherein one of the first and second friction surfaces has a plurality of grooves formed thereon.

31. A walk-behind working machine according to claim 30; wherein the grooves are generally straight.

32. A walk-behind working machine according to claim 22; wherein at least one of the first and second friction surfaces is generally smooth without any interruptions thereon.

33. A walk-behind working machine according to claim 22; wherein each of the first and second friction surfaces is generally smooth without any interruptions thereon.

34. A walk-behind working machine as claimed in claim 22; wherein the clutch lever comprises a single grip/clutch lever serving also as a grip handle for gripping by an operator to maneuver the walk-behind working machine during movement thereof.

* * * * *